(12) United States Patent
Nishimura et al.

(10) Patent No.: US 12,087,473 B2
(45) Date of Patent: Sep. 10, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Daisuke Ebata, Mie (JP); Masaki Mizushita, Mie (JP); Ryusuke Kudo, Mie (JP); Shintaro Sumida, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 228 days.

(21) Appl. No.: 17/609,988

(22) PCT Filed: May 26, 2020

(86) PCT No.: PCT/JP2020/020699
§ 371 (c)(1),
(2) Date: Nov. 9, 2021

(87) PCT Pub. No.: WO2020/241625
PCT Pub. Date: Dec. 3, 2020

(65) Prior Publication Data
US 2022/0208415 A1 Jun. 30, 2022

(30) Foreign Application Priority Data
May 31, 2019 (JP) ................................ 2019-102939

(51) Int. Cl.
*H01B 7/08* (2006.01)
*B60R 16/02* (2006.01)
*H02G 3/04* (2006.01)

(52) U.S. Cl.
CPC ....... *H01B 7/0823* (2013.01); *B60R 16/0215* (2013.01); *H02G 3/0406* (2013.01)

(58) Field of Classification Search
CPC . H01B 4/02; H01B 7/009; H01B 7/08; H01R 12/61; H01R 13/02; H01R 43/16
(Continued)

(56) References Cited

U.S. PATENT DOCUMENTS

| 4,918,261 A | 4/1990 | Takahashi et al. |
| 5,281,765 A * | 1/1994 | Iura ..................... H01B 7/0838 174/71 R |

(Continued)

FOREIGN PATENT DOCUMENTS

| JP | 59-57806 | 4/1984 |
| JP | 1-107414 | 4/1989 |

(Continued)

OTHER PUBLICATIONS

Japan Office Action issued in Japan Patent Application No. 2019-102939, dated Apr. 19, 2022, together with an English translation thereof.

(Continued)

*Primary Examiner* — William H. Mayo, III
(74) *Attorney, Agent, or Firm* — GREENBLUM & BERNSTEIN, P.L.C.

(57) ABSTRACT

A wiring member includes a first wiring member including a first sheet, and a plurality of first wire-like transmission members fixed onto the first sheet. The plurality of first wire-like transmission members include a second wire-like transmission member, and a third wire-like transmission (Continued)

member extending over the second wire-like transmission member and crossing the second wire-like transmission member. The wiring member further includes a holding member configured to hold a positional relationship between the second and third wire-like transmission members at a crossing part of the second and third wire-like transmission members.

15 Claims, 23 Drawing Sheets

(58) Field of Classification Search
USPC ........... 174/72 C, 72 TR, 84 R, 88 R, 110 R, 174/113 R, 117 R, 117 F, 117 FF
See application file for complete search history.

(56) References Cited

U.S. PATENT DOCUMENTS

| | | | |
|---|---|---|---|
| 9,722,338 B2 * | 8/2017 | Tominaga | H01R 4/021 |
| 10,867,721 B2 | 12/2020 | Ishida et al. | |
| 2002/0151197 A1 * | 10/2002 | Kawakita | H01R 9/226 |
| | | | 439/76.2 |
| 2004/0003938 A1 * | 1/2004 | Yoshida | H01R 12/616 |
| | | | 174/117 F |
| 2014/0090883 A1 | 4/2014 | Gundel | |
| 2014/0283989 A1 * | 9/2014 | Takano | B32B 37/1018 |
| | | | 156/285 |
| 2018/0349471 A1 * | 12/2018 | Toudji | G06F 16/2474 |

FOREIGN PATENT DOCUMENTS

| | | | |
|---|---|---|---|
| JP | 4-248209 | 9/1992 | |
| JP | 4-306506 | 10/1992 | |
| JP | 10-223056 | 8/1998 | |
| JP | 2014-096224 A * | 5/2014 | ............... H01B 7/08 |
| JP | 2014-519176 | 8/2014 | |
| JP | 2014-186800 | 10/2014 | |
| JP | 2015-154537 | 8/2015 | |
| JP | 2016-96132 | 5/2016 | |
| JP | 2018-137208 | 8/2018 | |

OTHER PUBLICATIONS

China Office Action issued in China Patent Application No. 202080038297.4, dated Nov. 25, 2022, together with an English translation thereof.
China Office Action issued in China Patent Application No. 202080038297.4, dated Jun. 1, 2023, together with an English translation thereof.
Japan Office Action issued in Japan Patent Application No. 2019-102939, dated Sep. 13, 2022, together with an English translation thereof.
International Search Report issued in International Patent Application No. PCT/JP2020/020699, dated Jul. 14, 2020, along with an English translation thereof.
International Preliminary Report on Patentability issued in International Patent Application No. PCT/JP2020/020699, dated Dec. 9, 2021, along with an English translation thereof.
China Office Action issued in China Patent Application No. 202080038297.4, dated Aug. 21, 2023, together with an English translation thereof.

* cited by examiner

F I G. 6
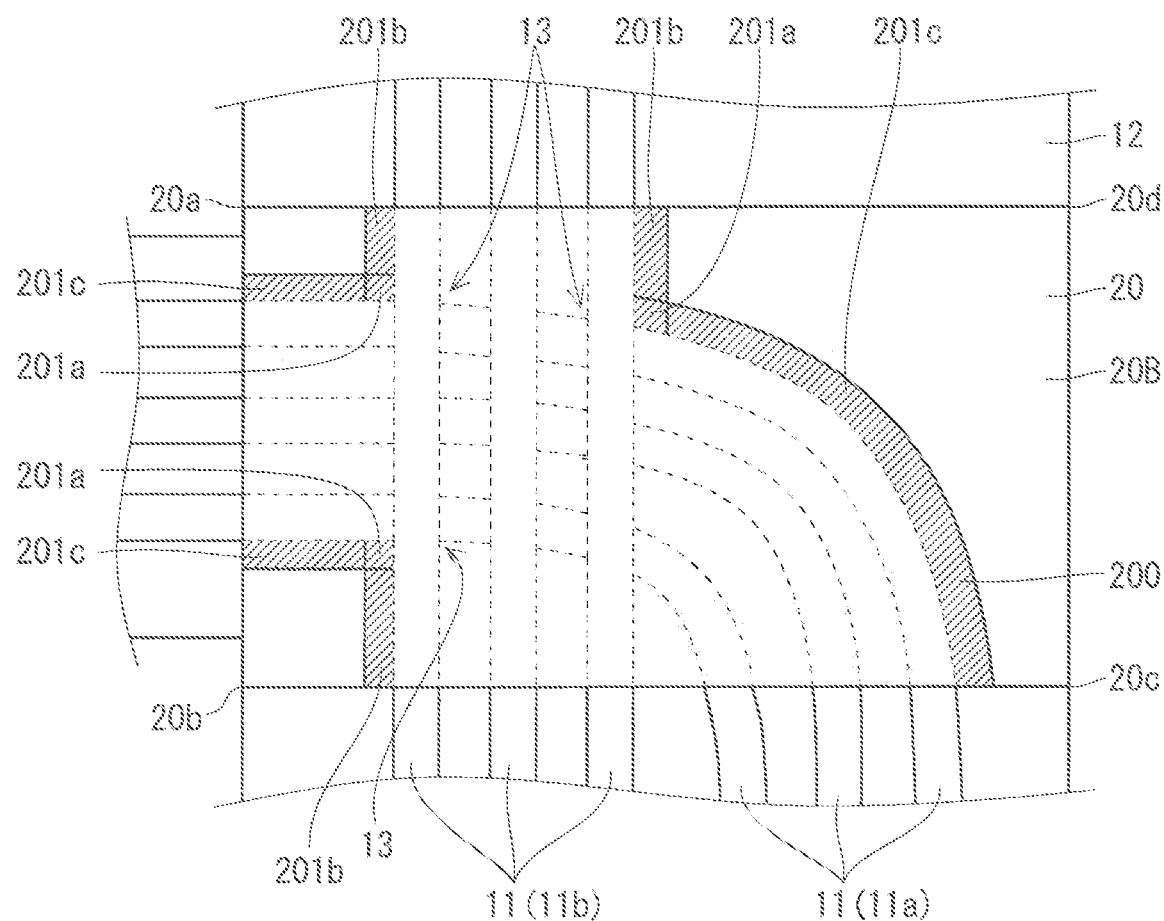

F I G. 8
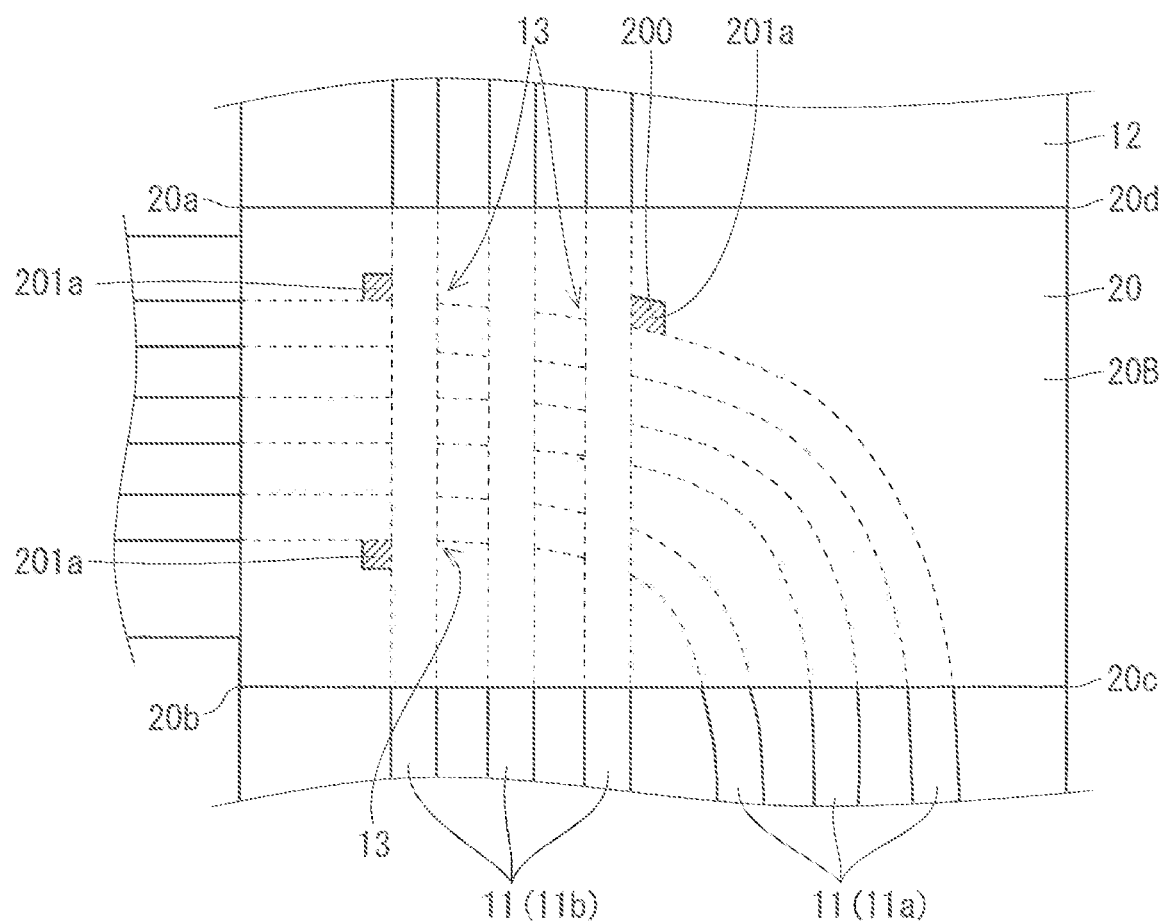

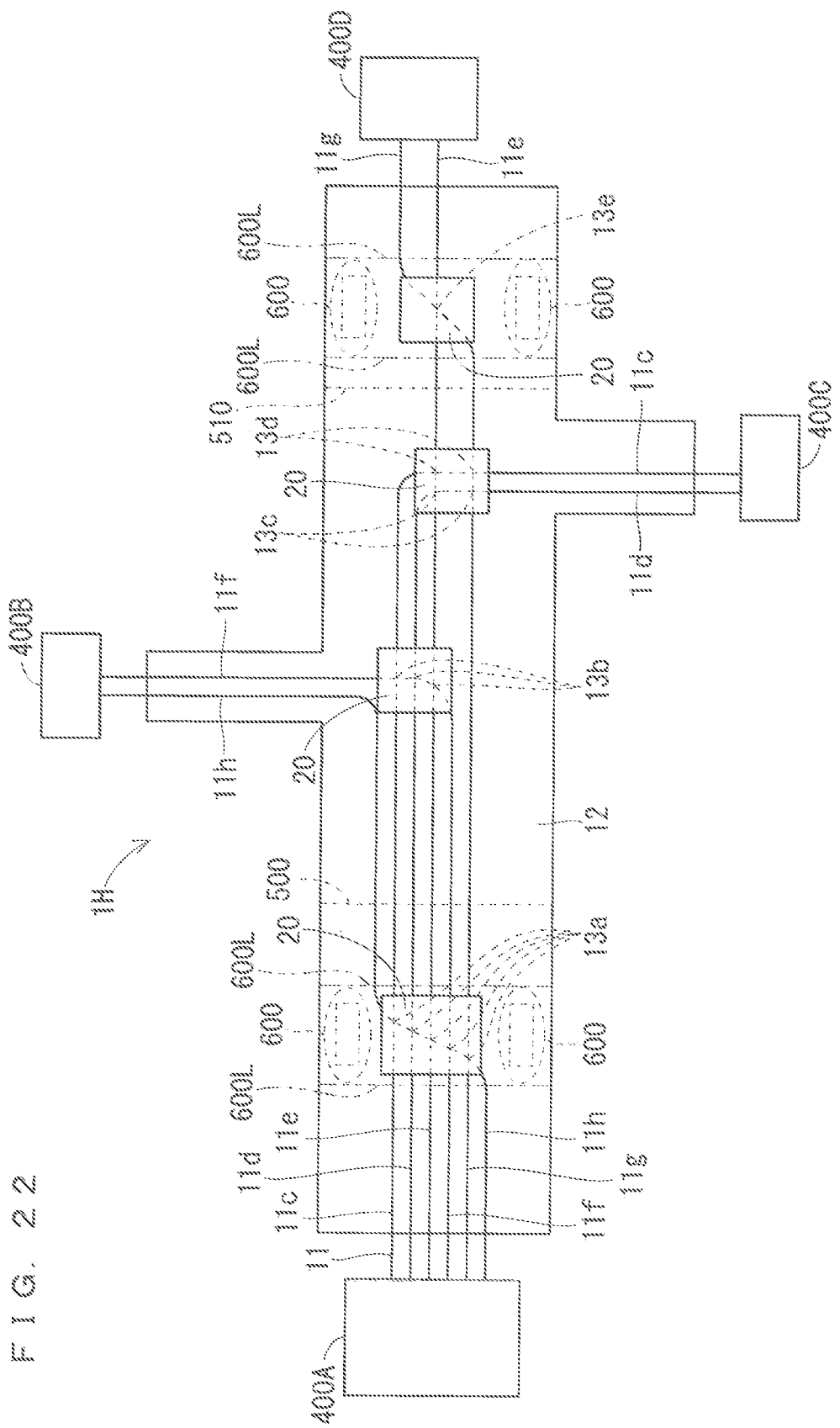
F I G. 2 2

ID MEMBER

TECHNICAL FIELD

The present disclosure relates to a wiring member.

BACKGROUND ART

Patent Document 1 describes a technology related to a flat wiring member.

PRIOR ART DOCUMENTS

Patent Documents

Patent Document 1: Japanese Patent Application Laid-Open No. 2018-137208

SUMMARY

Problem to be Solved by the Invention

Incidentally, in the flat wiring member, branch lines may be provided depending on a connection destination. In this case, a wire-like transmission member branching from a main line to a branch line and a wire-like transmission member of the main line are in some cases crossed with each other. In the crossing region, the wire-like transmission members overlap, and thus the thickness of the entire wiring member tends to be increased. Further, in particular, for example, when a bending force is applied to the flat wiring member, the thickness may be further increased in and near the region in which the wire-like transmission members are crossed with each other.

In view of this, an object is to provide a technology that can reduce thickness of a wiring member.

Means to Solve the Problem

A wiring member according to the present disclosure includes a first wiring member including a first sheet, and a plurality of first wire-like transmission members fixed onto the first sheet. The plurality of first wire-like transmission members include a second wire-like transmission member, and a third wire-like transmission member extending over the second wire-like transmission member and crossing the second wire-like transmission member. The wiring member further includes a holding member configured to hold a positional relationship between the second and third wire-like transmission members at a crossing part of the second and third wire-like transmission members.

Effects of the Invention

According to the present disclosure, the thickness of the wiring member can be reduced.

BRIEF DESCRIPTION OF DRAWINGS

FIG. 6 is a plan view illustrating an example of the wiring member according to the second embodiment.

FIG. 8 is a plan view illustrating an example of the wiring member according to the second embodiment.

FIG. 22 is a plan view illustrating an example of a wiring member according to the eighth embodiment.

DESCRIPTION OF EMBODIMENTS

Description of Embodiments of Present Disclosure

Figure 1:
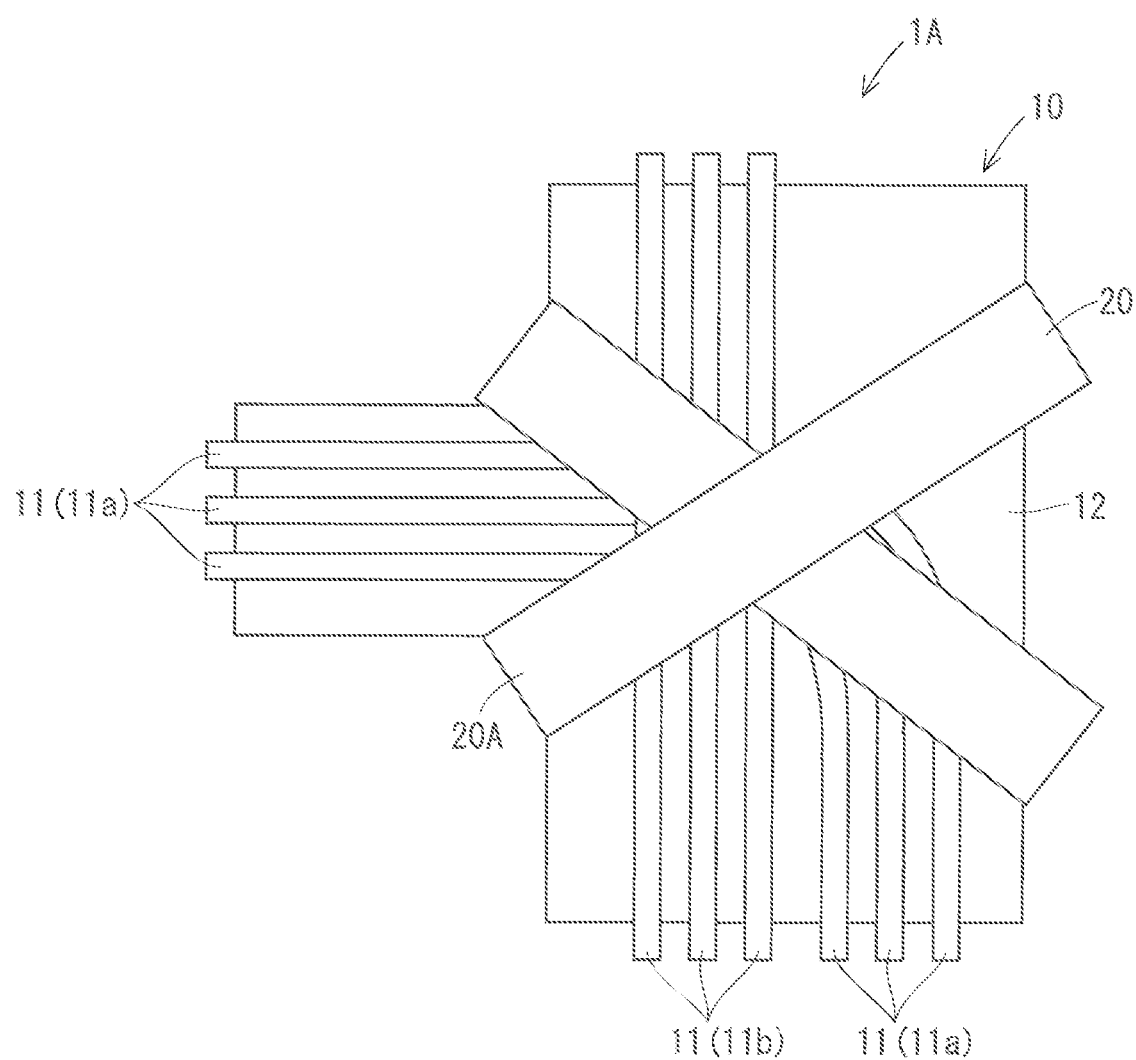
FIG. 1 is a plan view illustrating an example of a wiring member according to the first embodiment.

First, aspects of embodiments of the present disclosure will be listed below.

A wiring member according to the present disclosure is as follows.

(1) A wiring member includes a first wiring member including a first sheet, and a plurality of first wire-like transmission members fixed onto the first sheet, wherein the plurality of first wire-like transmission members include a second wire-like transmission member, and a third wire-like transmission member extending over the second wire-like transmission member and crossing the second wire-like transmission member, and the wiring member further includes a holding member configured to hold a positional relationship between the second and third wire-like transmission members at a crossing part of the second and third wire-like transmission members. According to the present disclosure, the holding member holds the positional relationship between the second and third wire-like transmission members at the crossing part of the second and third wire-like transmission members, and therefore the thickness of the wiring member at and near the crossing part can be reduced.

(2) The holding member may include a tape wound around the first sheet so as to cover the crossing part. In this case, by winding the tape around the first sheet, the positional relationship between the second and third wire-like transmission members at the crossing part can be easily held.

(3) The holding member may include a second sheet fixed to the first sheet so as to cover the crossing part. In this case, by fixing the second sheet to the first sheet, the positional relationship between the second and third wire-like transmission members at the crossing part can be easily held.

(4) A fixed region of the second sheet fixed to the first sheet may include a first region located around the crossing part. In this case, at the crossing part, the position of the third wire-like transmission member is less liable to be changed, and therefore the positional relationship between the second and third wire-like transmission members at the crossing part can be firmly held.

(5) The fixed region may include a second region extending along an edge of the third wire-like transmission member from the first region. In this case, the fixed region includes not only the first region but also the second region extending along the third wire-like transmission member from the first region, and therefore the position of the third wire-like transmission member is less liable to be changed. Consequently, the positional relationship between the second and third wire-like transmission members at the crossing part can be firmly held.

(6) A fixed region of the second sheet fixed to the first sheet may include a region extending along an edge of the third wire-like transmission member. In this case, the position of the third wire-like transmission member is less liable to be changed, and therefore the positional relationship between the second and third wire-like transmission members at the crossing part can be firmly held.

(7) The holding member may include a second wiring member placed over the first wiring member so as to cover the crossing part. In this case, the number of wires can be increased, and the positional relationship between the second and third wire-like transmission members at the crossing part can be held.

(8) The second wiring member may include a third sheet, and a plurality of fourth wire-like transmission members fixed onto the third sheet. In this case, the first wiring member and the second wiring member including the holding member have similar structures, and therefore manufacture of the first wiring member and the wiring member including the holding member is facilitated.

(9) The holding member may include a joining member configured to join the second and third wire-like transmission members. The joining member may include a first portion adhering to the second and third wire-like transmission members around the crossing part. In this case, the second and third wire-like transmission members are joined around the crossing part, and therefore the positional relationship between the second and third wire-like transmission members at the crossing part can be firmly held.

(10) The joining member may include a second portion interposed between the second and third wire-like transmission members at the crossing part. In this case, the second and third wire-like transmission members are joined at and around the crossing part, the positional relationship between the second and third wire-like transmission members at the crossing part can be firmly held.

(11) The holding member may include a joining member being interposed between the second and third wire-like transmission members at the crossing part, and being configured to join the second and third wire-like transmission members. In this case, the second and third wire-like transmission members are joined at the crossing part, and therefore the positional relationship between the second and third wire-like transmission members at the crossing part can be firmly held.

(12) The holding member may be located at a position except a fold of the wiring member. In this case, paths of the first wire-like transmission members are prevented from being disturbed on the first sheet, and the first wire-like transmission members are prevented from separating from the first sheet.

(13) The wiring member may further include a vehicle fixing portion attached to the first sheet. The holding member may be located in a region of the first sheet corresponding to the vehicle fixing portion. In this case, the wiring member is less liable to be folded at the crossing part, and paths of the first wire-like transmission members are prevented from being disturbed on the first sheet, and the first wire-like transmission members are prevented from separating from the first sheet.

Details of Embodiments of Present Disclosure

Specific examples of a wiring member according to the present disclosure will be described below with reference to the drawings. Note that the present disclosure is not limited to these examples but is recited in the claims, and encompasses meanings equivalent to those of the claims and all modifications within the scope of the claims.

First Embodiment

Figure 2:
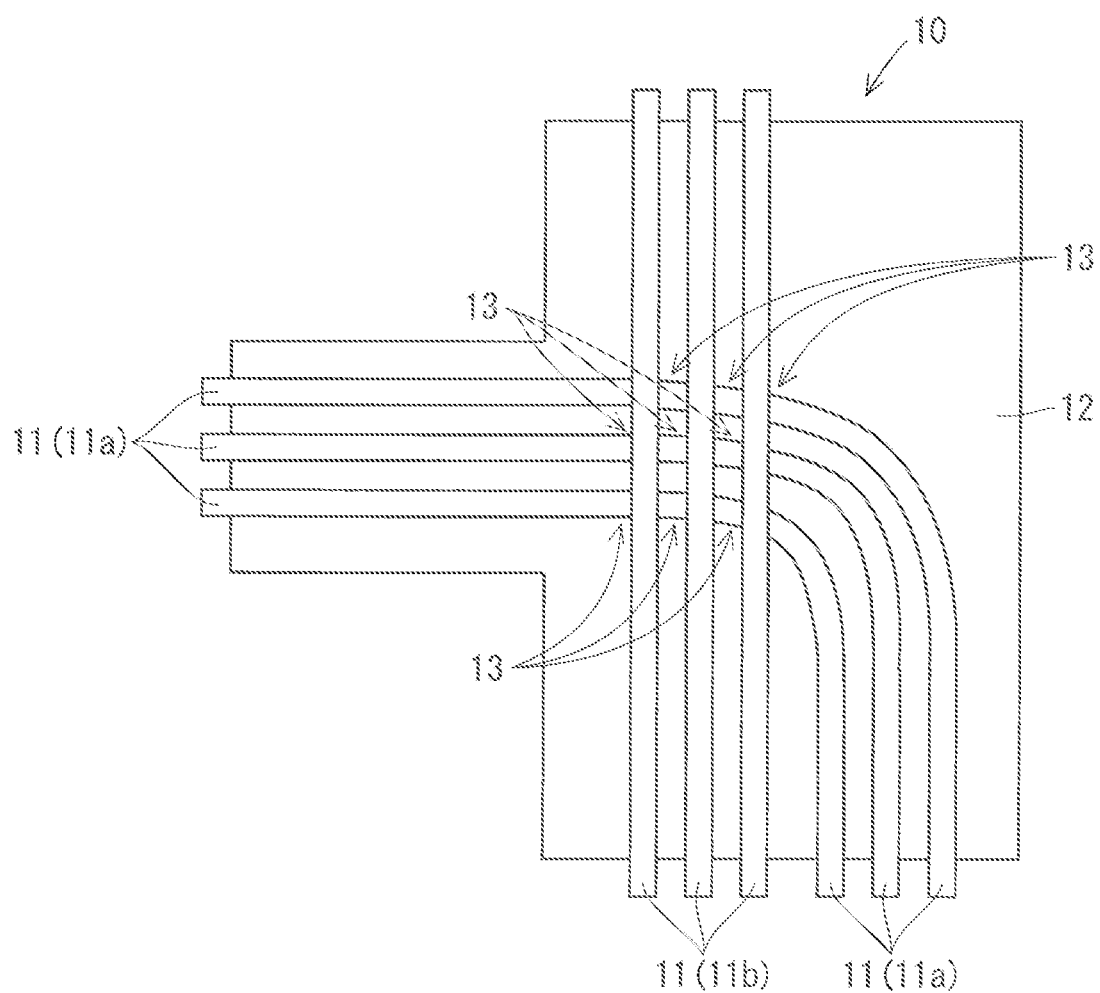
FIG. 2 is a plan view illustrating an example of the wiring member according to the first embodiment.

A wiring member 1A according to the first embodiment will be described below. FIG. 1 is a schematic plan view of the wiring member 1A. FIG. 2 is a schematic plan view of a wiring member 10 included in the wiring member 1A. The wiring member 1A includes the wiring member 10, and a holding member 20 attached to the wiring member 10.

The wiring member 10 is, for example, a member that connects a plurality of components mounted in a vehicle of an automobile. The wiring member 10 is, for example, a flat member. The wiring member 10 includes a plurality of wire-like transmission members 11 and a sheet 12. The wire-like transmission member 11 is a wire-like member that allows transmission of electricity, light, and the like. In the present example, the wire-like transmission member 11 is an electric wire including a core wire, and insulation covering that covers the core wire. The core wire is a wire-like conductor that is made of a conductive member such as metal. The core wire includes one or a plurality of element wires. The insulation covering is an insulation portion that covers outer periphery of the core wire. The wire-like transmission member 11 may be a bare lead wire, a shield wire, a twist wire, an enameled wire, a nichrome wire, an optical fiber, or the like, other than the electric wire.

The sheet 12 is a sheet-like member that keeps the plurality of wire-like transmission members 11 in a flat shape. The sheet 12 is made of resin or the like. The sheet 12 may include metal. The sheet 12 may include a nonwoven sheet. The plurality of wire-like transmission members 11 are fixed to one main surface of the sheet 12. The plurality of wire-like transmission members 11 are in a parallel state on one main surface of the sheet 12. Fixing of the wire-like transmission members 11 to the sheet 12 is performed with welding, bonding, adhesion, or the like. Welding may be ultrasonic welding, or may be thermal welding. When the plurality of wire-like transmission members 11 are fixed to one main surface of the sheet 12, the plurality of wire-like transmission members 11 are kept in a flat state.

In the present example, the plurality of wire-like transmission members 11 include a plurality of curved wire-like transmission members 11a and a plurality of straight wire-like transmission members 11b. The plurality of wire-like transmission members 11a are disposed in parallel with each other, and the plurality of wire-like transmission members 11b are disposed in parallel with each other. A part of each of the wire-like transmission members 11a is disposed in parallel with the wire-like transmission members 11b.

The wiring member 10 includes crossing parts 13 at which the wire-like transmission members 11a and the wire-like transmission members 11b cross each other. In the present example, the wiring member 10 includes a plurality of crossing parts 13. At each of the crossing parts 13, the wire-like transmission member 11b extends over the wire-like transmission member 11a. In the present example, the wiring member 10 includes nine crossing parts 13. The number of crossing parts 13 included in the wiring member 10 may be less than 9, or may be 10 or more.

The holding member 20 is a member that holds a positional relationship between the wire-like transmission members 11a and the wire-like transmission members 11b at the crossing parts 13. In the present example, the holding member 20 includes a tape 20A wound around the sheet 12 so as to cover the crossing parts 13. In the present example, one tape 20A having adhesiveness on one surface is wound around the sheet 12 so as to cover all of the plurality of crossing parts 13. The tape 20A is wound around the sheet 12 so as to press each wire-like transmission member 11b onto the sheet 12 side. In this manner, at each crossing part 13, the wire-like transmission member 11b is pressed onto the wire-like transmission member 11a. It can also be said that the tape 20A is wound around the sheet 12 so as to press the wire-like transmission member 11b onto the wire-like transmission member 11a at each crossing part 13. The tape 20A is bonded to the wire-like transmission members 11a and 11b. The tape 20A is present not only on one main surface of the sheet 12 to which the wire-like transmission members 11 are fixed, but also on another main surface of the sheet 12 on the opposite side of the one main surface.

Note that the tape 20A need not cover a part of the plurality of crossing parts 13. Further, the holding member 20 may include a plurality of tapes 20A wound around the sheet 12 that cover at least one crossing part 13.

Here, a case in which the wiring member 1A does not include the holding member 20 is considered. In this case, at the crossing parts 13, the wire-like transmission members 11b may come loose from the wire-like transmission members 11a. Alternatively, when the wiring member 10 is routed in the vehicle, for example, the wire-like transmission members 11b may come loose from the wire-like transmission members 11a to a greater degree. Further, at positions near the crossing parts 13, the wire-like transmission members 11b may come loose from the sheet 12. Alternatively, when the wiring member 10 is routed in the vehicle, for example, the wire-like transmission members 11b may come loose from the sheet 12 to a greater degree. Because of this, at and near the crossing parts 13, the thickness of the wiring member 1A may be increased. When the thickness of the wiring member 1A is increased, the wiring member 1A may interfere with the surroundings.

In contrast, the wiring member 1A according to the present embodiment includes the holding member 20 that holds the positional relationship between the wire-like transmission members 11a and 11b at the crossing parts 13 of the wire-like transmission members 11a and 11b. With the positional relationship between the wire-like transmission members 11a and 11b at the crossing parts 13 being held, the thickness of the wiring member 1A can be reduced at and near the crossing parts 13.

Further, in the present embodiment, the holding member 20 includes the tape 20A wound around the sheet 12 so as to cover the crossing parts 13. With this configuration, by winding the tape 20A around the sheet 12, the positional relationship between the wire-like transmission members 11a and 11b at the crossing parts can be easily held.

Second Embodiment

Figure 3:
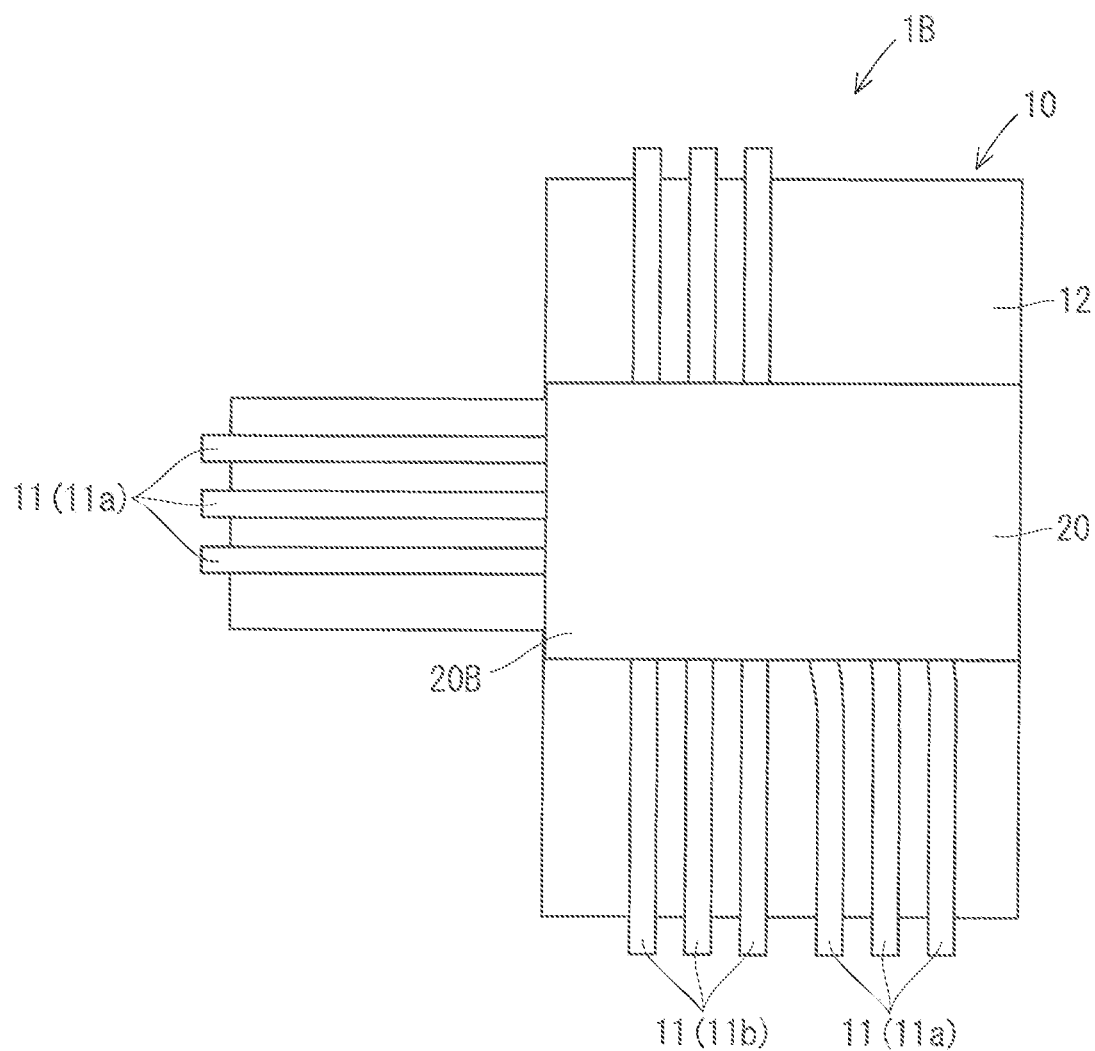
FIG. 3 is a plan view illustrating an example of a wiring member according to the second embodiment.

A wiring member 1B according to the second embodiment will be described. FIG. 3 is a schematic plan view of the wiring member 1B. Note that, in the description of the present embodiment, constituent elements similar to those described in the first embodiment are denoted by the same reference signs, and description thereof will be omitted.

The holding member 20 included in the wiring member 1B includes a sheet 20B fixed to the sheet 12 so as to cover the crossing parts 13. In the present example, the sheet 20B is fixed to the sheet 12 so as to cover all of the plurality of crossing parts 13. The sheet 20B is, for example, a fusion sheet. The sheet 20B may be fused to the sheet 12 using ultrasonic fusion, thermal fusion, or another method. The sheet 20B may be a sheet other than a fusion sheet. In this case, the sheet 20B may be fixed to the sheet 12 using a double-sided tape, an adhesive agent, or the like.

The sheet 20B is fixed to one main surface of the sheet 12 so as to press each wire-like transmission member 11b onto the sheet 12 side. In this manner, at each crossing part 13, the wire-like transmission member 11b is pressed onto the wire-like transmission member 11a. It can also be said that the sheet 20B is fixed to the sheet 12 so as to press the wire-like transmission member 11b onto the wire-like transmission member 11a at each crossing part 13. The sheet 20B may cover only a part of the plurality of crossing parts 13. In the present example, the shape of the sheet 20B is a rectangular shape, but may be another shape.

FIGS. 4 to 9 are each a diagram illustrating an example of a fixed region 200 of the sheet 20B fixed to the sheet 12. In illustration of FIGS. 4 to 9, a part of the wiring member 1B is enlarged. In FIGS. 4 to 9, the fixed region 200 is hatched. Note that the shape of the fixed region 200 is not limited to that in the example of the FIGS. 4 to 9.

Figure 4:
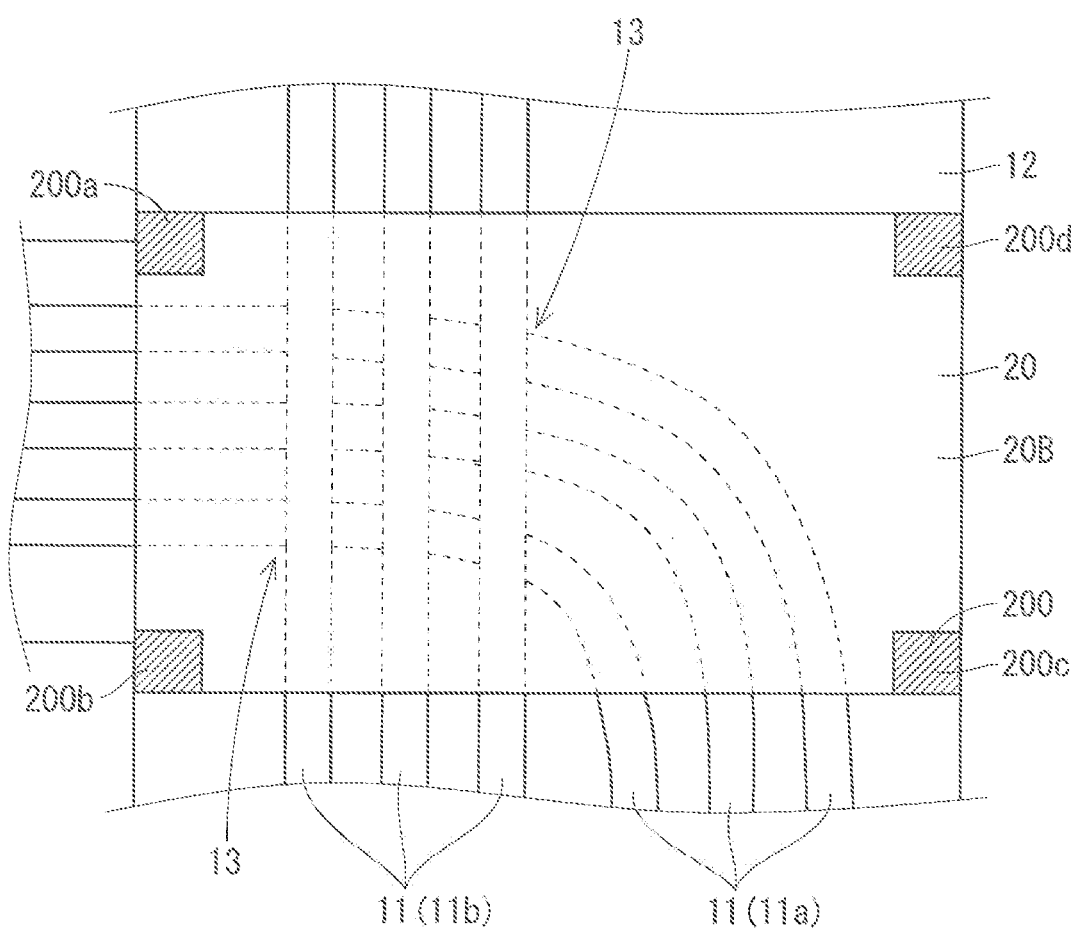
FIG. 4 is a plan view illustrating an example of the wiring member according to the second embodiment.

In the example of FIG. 4, the four corners of the sheet 20B are fixed to the sheet 12. The fixed region 200 includes a plurality of fixed regions 200a, 200b, 200c, and 200d that are respectively located at the four corners of the sheet 20B.

Figure 5:
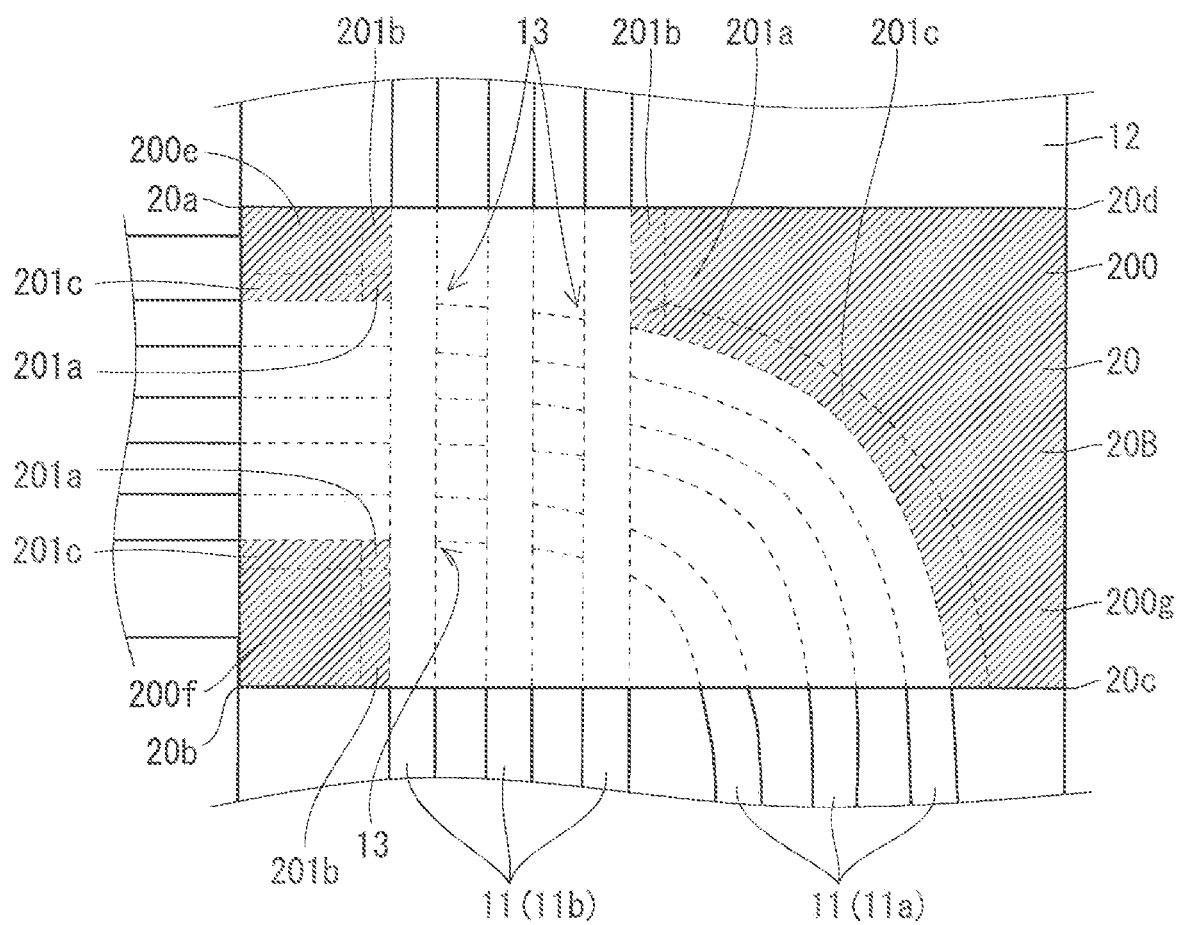
FIG. 5 is a plan view illustrating an example of the wiring member according to the second embodiment.

In the example of FIG. 5, the fixed region 200 includes a fixed region 200e that extends from a first corner 20a of the sheet 20B to the edges of the crossing wire-like transmission members 11a and 11b closest to the first corner 20a. The fixed region 200e is a region surrounded by two sides of the sheet 20B extending from the first corner 20a and the edges of the crossing wire-like transmission members 11a and 11b closest to the first corner 20a.

The fixed region 200 includes a fixed region 200f extending from a second corner 20b of the sheet 20B to the edges of the crossing wire-like transmission members 11a and 11b closest to the second corner 20b. The fixed region 200f is a region surrounded by two sides of the sheet 20B extending from the second corner 20b and the edges of the crossing wire-like transmission members 11a and 11b closest to the second corner 20b.

The fixed region 200 includes a fixed region 200g that extends from a third corner 20c and a fourth corner 20d of the sheet 20B to the edges of the crossing wire-like transmission members 11a and 11b closest to the third corner 20c and the fourth corner 20d. The fixed region 200g is a region surrounded by two sides of the sheet 20B extending from the third corner 20c, two sides of the sheet 20B extending from the fourth corner 20d, and the edges of the crossing wire-like transmission members 11a and 11b closest to the third corner 20c and the fourth corner 20d.

Each of the fixed regions 200e, 200f, and 200g includes a fixed region 201a located around the crossing parts 13. Further, each of the fixed regions 200e, 200f, and 200g includes a fixed region 201b that extends along the edges of the wire-like transmission members 11b from the fixed region 201a. Further, each of the fixed regions 200e, 200f, and 200g includes a fixed region 201c that extends along the edges of the wire-like transmission members 11a from the fixed region 201a.

Figure 7:
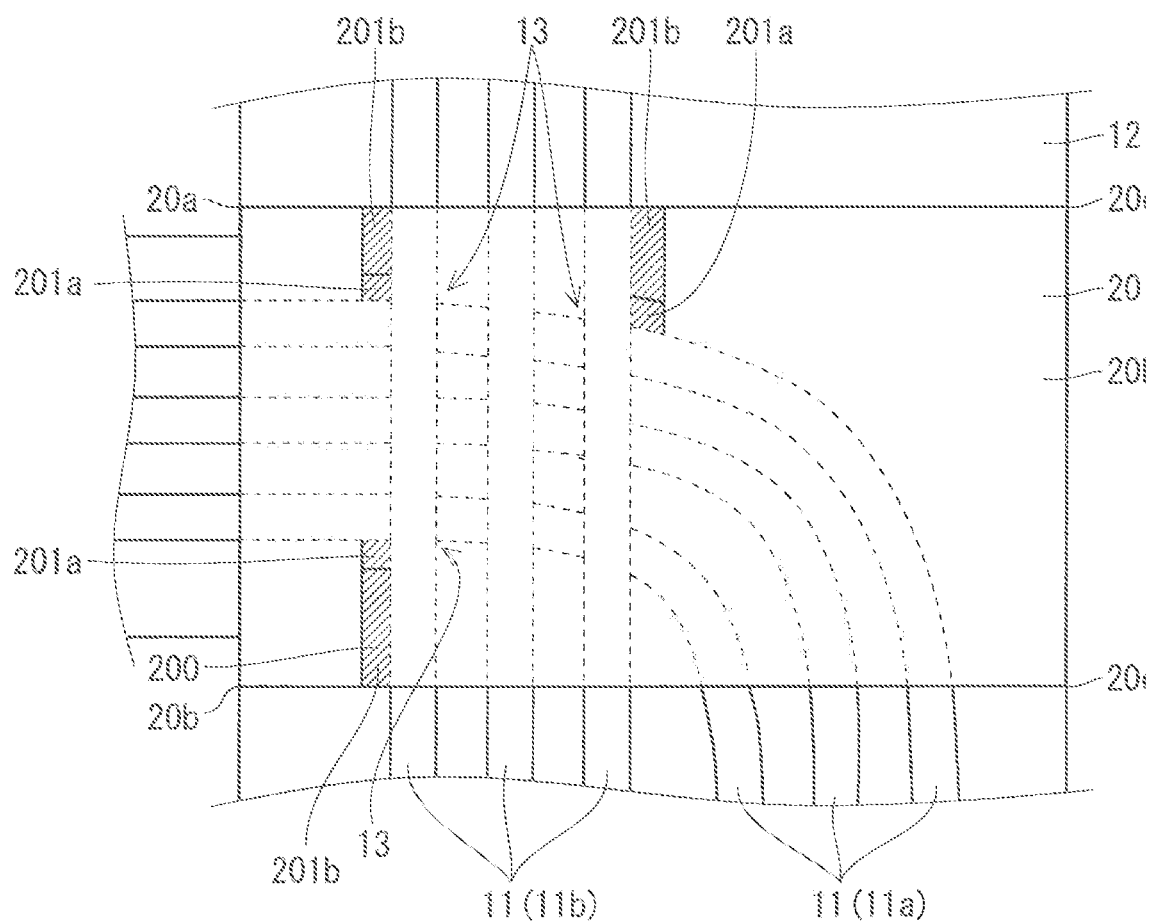
FIG. 7 is a plan view illustrating an example of the wiring member according to the second embodiment.

In the example of FIG. 6, the fixed region 200 only includes the fixed regions 201a, 201b, and 201c illustrated in FIG. 5. In the example of FIG. 7, the fixed region 200 includes only the fixed regions 201a and 201b illustrated in FIG. 5. It can be said that a region that combines the fixed regions 201a and 201b is a region that extends along the wire-like transmission members 11b. In the example of FIG. 7, as in the example of FIG. 4, the third corner 20c of the sheet 20B may be fixed to the sheet 12.

In the example of FIG. 8, the fixed region 200 includes only the fixed region 201a illustrated in FIG. 5. In the example of FIG. 8, as in the example of FIG. 4, the third corner 20c of the sheet 20B may be fixed to the sheet 12.

Figure 9:
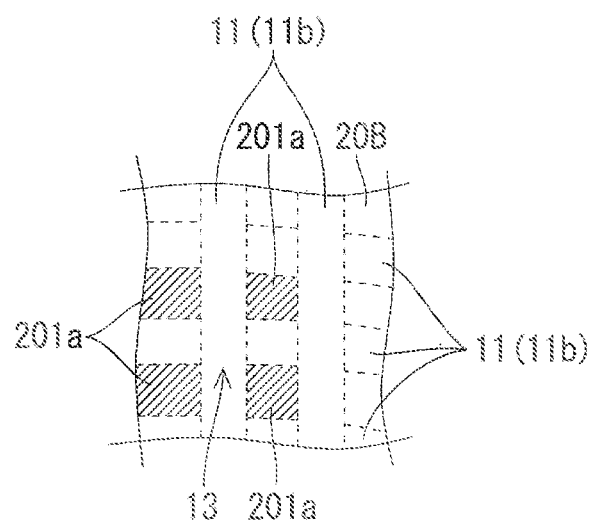
FIG. 9 is a plan view illustrating an example of the wiring member according to the second embodiment.

Note that, as illustrated in FIG. 9, the fixed region 201a may be provided at a plurality of positions around the crossing parts 13. In the example of FIG. 9, the fixed region 201a is provided at four positions around the crossing parts 13. The fixed region 201a may be provided at two positions or at three positions around the crossing parts 13.

In this manner, in the present embodiment, the holding member 20 includes the sheet 20B fixed to the sheet 12 so as to cover the crossing parts 13. With this configuration, by fixing the sheet 20B to the sheet 12, the positional relationship between the wire-like transmission members 11a and 11b at the crossing parts 13 can be easily held.

Further, when the fixed region 200 of the sheet 20B includes the fixed region 201a located around the crossing parts 13, the positions of the wire-like transmission members 11b are less liable to be changed. Accordingly, the positional relationship between the wire-like transmission members 11a and 11b at the crossing parts 13 can be firmly held.

Further, when the fixed region 200 includes a region that extends along the edges of the wire-like transmission members 11b, the positions of the wire-like transmission members 11b are less liable to be changed. Accordingly, the positional relationship between the wire-like transmission members 11a and 11b at the crossing parts 13 can be firmly held.

Further, when the fixed region 200 includes not only the fixed region 201a but also the fixed region 201b that extends along the edges of the wire-like transmission members 11b from the fixed region 201a, the positions of the wire-like transmission members 11b are further less liable to be changed. Accordingly, the positional relationship between the wire-like transmission members 11a and 11b at the crossing parts 13 can be further firmly held.

Third Embodiment

Figure 10:
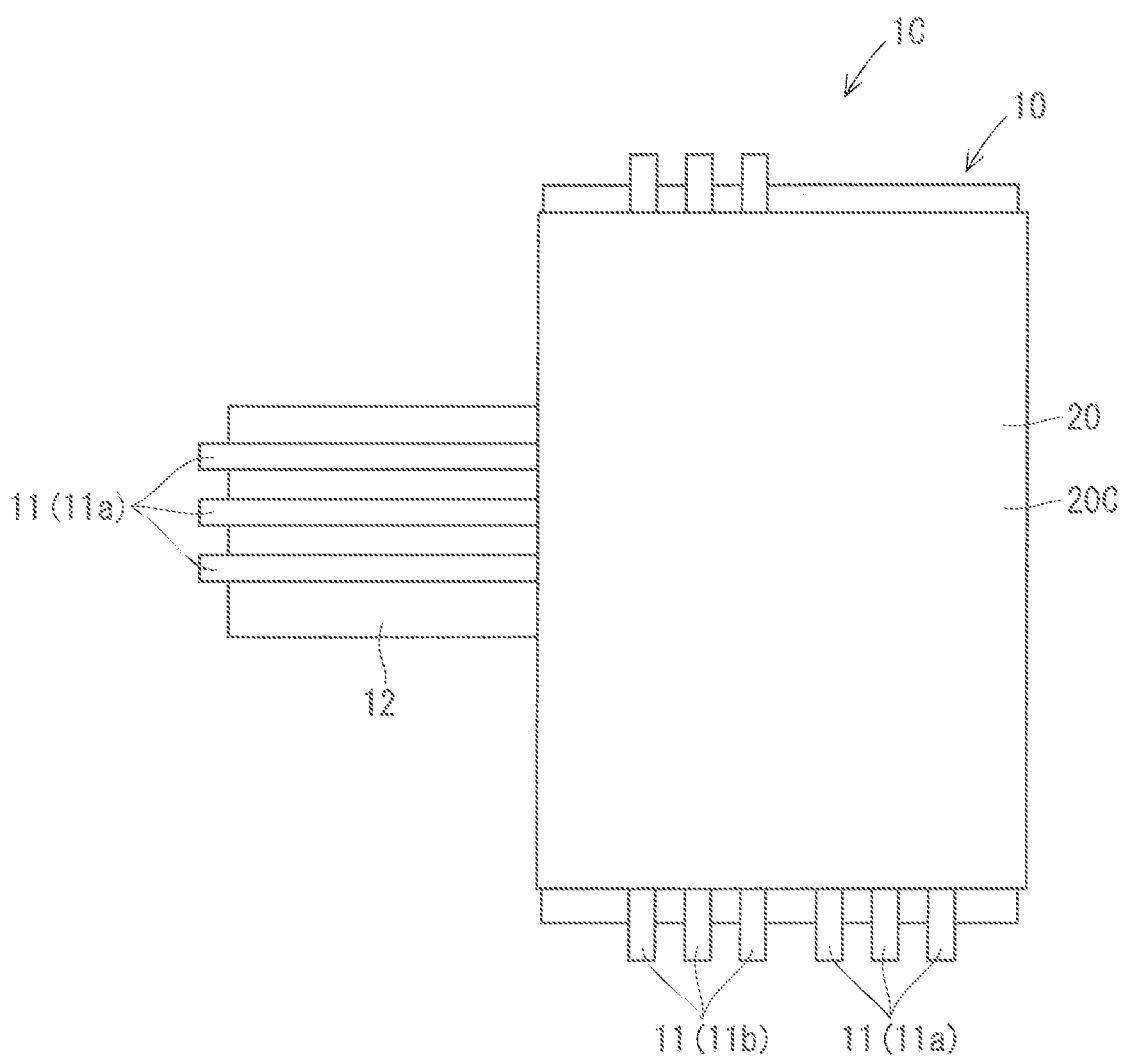
FIG. 10 is a plan view illustrating an example of a wiring member according to the third embodiment.

A wiring member 1C according to the third embodiment will be described. FIG. 10 is a schematic plan view of the wiring member 1C. Note that, in the description of the present embodiment, constituent elements similar to those described in the first and second embodiments are denoted by the same reference signs, and description thereof will be omitted.

The holding member 20 included in the wiring member 1C includes a wiring member 20C that is placed over the wiring member 10 so as to cover the crossing parts 13. The wiring member 20C is stacked on the wiring member 10. The wiring member 20C is placed over the wiring member 10 so as to press each wire-like transmission member 11b onto the sheet 12 side. In this manner, at each crossing part 13, the wire-like transmission member 11b is pressed onto the wire-like transmission member 11a. It can also be said that the wiring member 20C is placed over the wiring member 10 so as to press the wire-like transmission member 11b onto the wire-like transmission member 11a at each crossing part 13.

The wiring member 20C is, for example, a member that connects a plurality of components mounted in a vehicle of an automobile. The wiring member 20C is, for example, a flat member. The wiring member 20C includes, for example, a structure similar to that of the wiring member 10.

Figure 11:
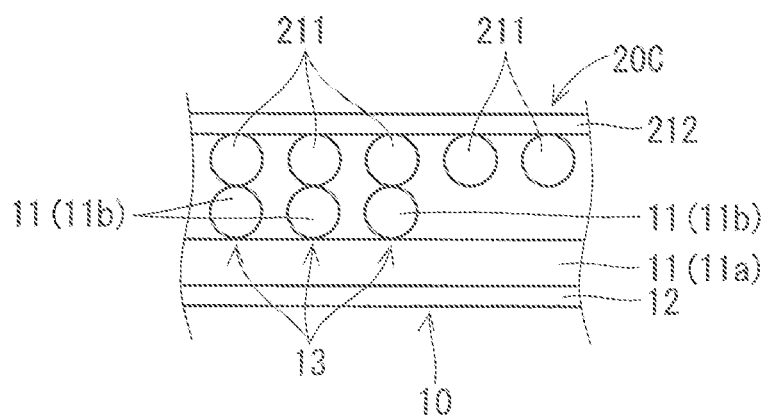
FIG. 11 is a cross-sectional view illustrating an example of the wiring member according to the third embodiment.

FIG. 11 is a schematic cross-sectional view of the wiring member 1C. As illustrated in FIG. 11, the wiring member 20C includes a plurality of wire-like transmission members 211 and a sheet 212. The wire-like transmission member 211 is a wire-like member that allows transmission of electricity, light, and the like, similarly to the wire-like transmission member 11. The sheet 212 is a sheet-like member that keeps the plurality of wire-like transmission members 211 in a flat shape. The plurality of wire-like transmission members 211 are fixed to one main surface of the sheet 212. The plurality of wire-like transmission members 211 are in a parallel state on one main surface of the sheet 212. The above description in regard to the wire-like transmission members 11 and the sheet 12 can also be applied to the wire-like transmission members 211 and the sheet 212.

As illustrated in FIG. 11, the wiring member 20C is, for example, placed over the wiring member 10 so that the wire-like transmission members 211 and the wire-like transmission members 11 of the wiring member 10 face each other. The wiring member 20C may be placed over the wiring member 10 so that the sheet 212 overlaps the wire-like transmission members 11 of the wiring member 10.

The structure for keeping the wiring member 10 and the wiring member 20C to be in a stacked state is not specifically limited. For example, a configuration in which a binding member such as an adhesive tape is wound around the stacked structure of the wiring members 10 and 20C may be adopted. Further, the wiring members 10 and 20C may be bonded together with an adhesive agent, a double-sided tape, or the like interposed therebetween. Further, a configuration in which the sheets 12 and 212 of both side parts of the wiring members 10 and 20C are joined together with welding, an adhesive tape, an adhesive agent, or the like, or are kept in a state of being placed over each other with a clamp or the like may be adopted.

The structure of the wiring member 20C may be a structure different from that of the wiring member 10. For example, the plurality of wire-like transmission members 211 may be kept in a flat state with a flat frame member or the like. The plurality of wire-like transmission members 211 may be directly joined to each other in a form of being disposed in parallel with each other so as to be in a flat form. Further, the wiring member 20C may be kept in a flat state in a state in which a plurality of wire-like conductors are insulated from each other by an insulation member, such as a flexible flat cable (FCC) and a flexible printed circuit (FPC). In other words, the wiring member 20C may be a wiring member in which a plurality of wire-like conductors are held in a flat form in a state of being insulated from each other and the thickness is formed smaller than the width as a whole. Further, the wiring member 20C need not be a flat member.

In this manner, in the present embodiment, the holding member 20 includes the wiring member 20C that is placed over the wiring member 10 so as to cover the crossing parts 13. With this configuration, the number of wires can be increased, and the positional relationship between the wire-like transmission members 11a and 11b at the crossing parts 13 can be held.

Further, as in the example of FIG. 11, when the wiring member 20C included in the holding member 20 includes a structure similar to that of the wiring member 10, manufacture of the wiring member 10 and the wiring member 1C including and the holding member 20 is facilitated.

Fourth Embodiment

Figure 12:
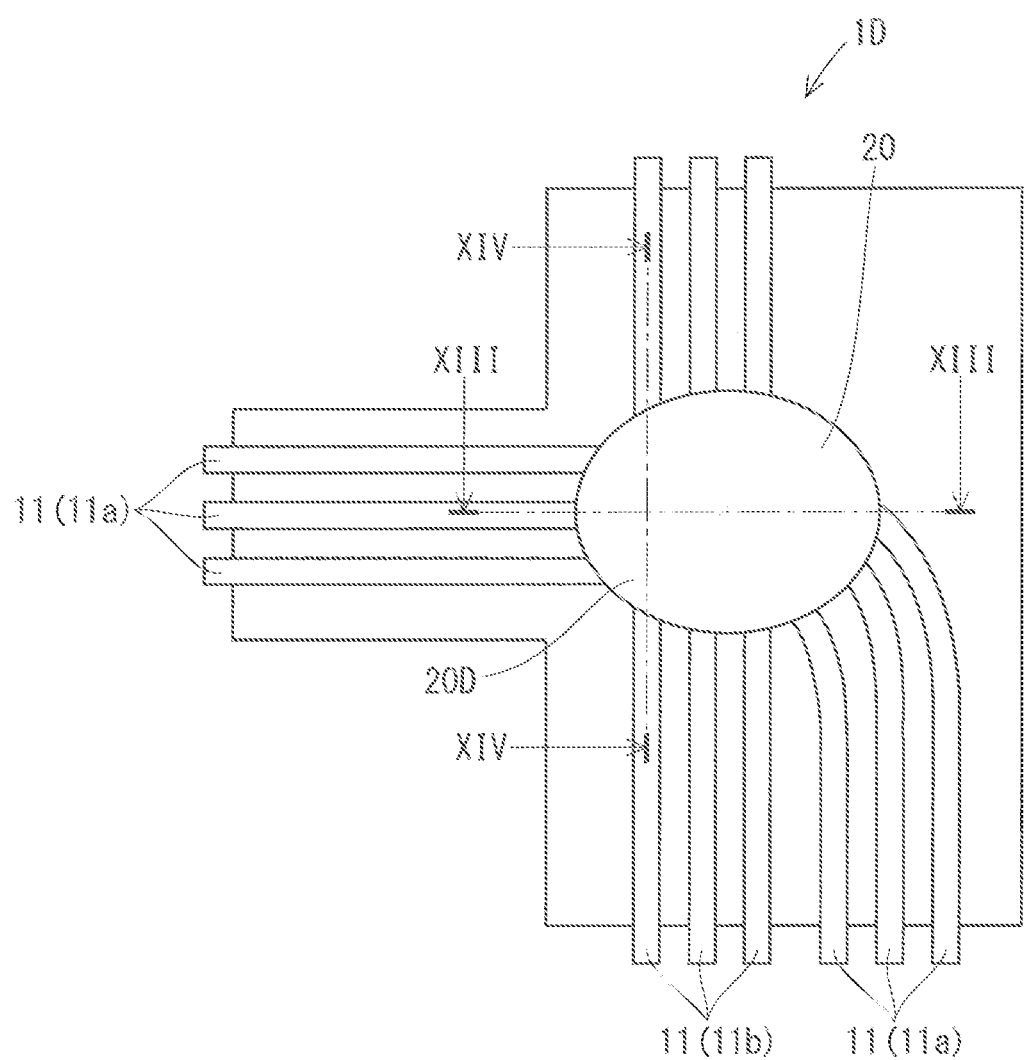
FIG. 12 is a plan view illustrating an example of a wiring member according to the fourth embodiment.

A wiring member 1D according to the fourth embodiment will be described. FIG. 12 is a schematic plan view of the wiring member 1D. Note that, in the description of the present embodiment, constituent elements similar to those described in the first, second, and third embodiments are denoted by the same reference signs, and description thereof will be omitted.

The holding member 20 included in the wiring member 1D includes a joining member 20D that joins the wire-like transmission members 11a and 11b to each other. The joining member 20D is, for example, a member obtained by solidifying a fluid. The joining member 20D may be made of a thermoplastic resin such as a hot melt adhesive, or may be made of a blowing agent having adhesiveness. In the present example, the joining member 20D is caused to flow onto the sheet 12 of the wiring member 10 so as to cover each crossing part 13 and is then solidified.

Figure 13:
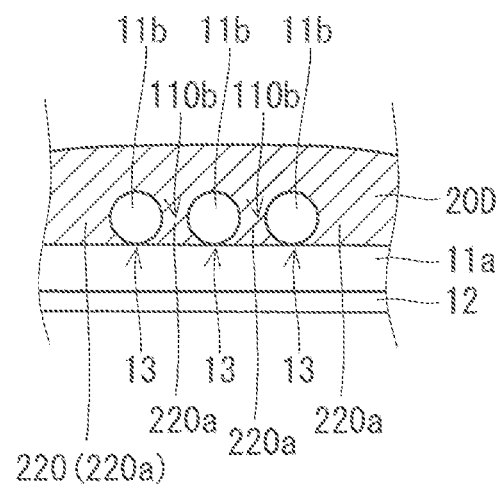
FIG. 13 is a cross-sectional view illustrating an example of the wiring member according to the fourth embodiment.
Figure 14:
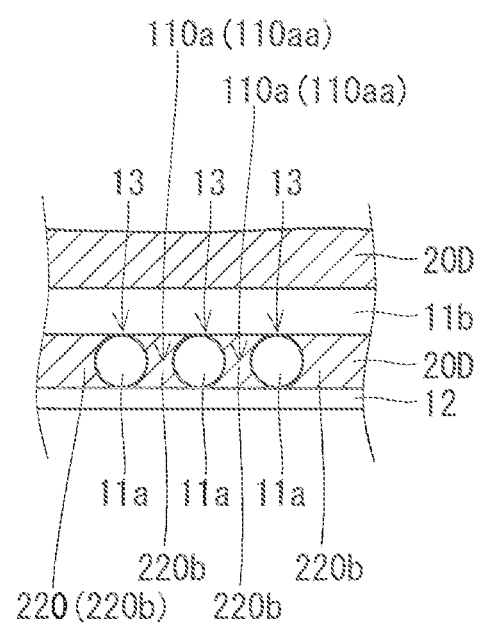
FIG. 14 is a cross-sectional view illustrating an example of the wiring member according to the fourth embodiment.

FIG. 13 is a schematic cross-sectional view as seen in the direction of the arrows XIII-XIII of FIG. 12. FIG. 14 is a schematic cross-sectional view as seen in the direction of the arrows XIV-XIV of FIG. 12. In FIGS. 13 and 14, the joining member 20D is hatched.

As illustrated in FIG. 13, the joining member 20D includes a part located outside two outermost wire-like transmission members 11b among the plurality of wire-like transmission members 11b disposed in parallel with each other. Further, the joining member 20D fills a gap 110b between two adjacent wire-like transmission members 11b. The joining member 20D includes a part located outside two outermost wire-like transmission members 11b among the plurality of wire-like transmission members 11b disposed in parallel with each other.

Further, as illustrated in FIG. 14, the joining member 20D includes a part located outside two outermost wire-like transmission members 11a among the plurality of wire-like transmission members 11a disposed in parallel with each other. Further, the joining member 20D fills a gap 110a between two adjacent wire-like transmission members 11a. The joining member 20D fills portions 110aa of the gap 110a in which the wire-like transmission members 11b are present above as well as portions in which the wire-like transmission members 11b are not present above. In other words, the joining member 20D fills the gaps 110aa between the wire-like transmission members 11a located below the wire-like transmission members 11b.

The joining member 20D includes first portions 220 adhering to the wire-like transmission members 11a and 11b around the crossing parts 13. Specifically, around the crossing parts 13, the joining member 20D includes the first portions 220a that are located on the wire-like transmission members 11a and adhere to the wire-like transmission members 11a and 11b (see FIG. 13). In addition, around the crossing parts 13, the joining member 20D includes first portions 220b that are located on the sheet 12 and adhere to the wire-like transmission members 11a and 11b (see FIG. 14).

In this manner, in the present embodiment, the joining member 20D includes the first portions 220 adhering to the wire-like transmission members 11a and 11b around the crossing parts 13, and thus the wire-like transmission members 11a and 11b are joined around the crossing parts 13. Accordingly, the positional relationship between the wire-like transmission members 11a and 11b at the crossing parts 13 can be firmly held.

Figure 15:
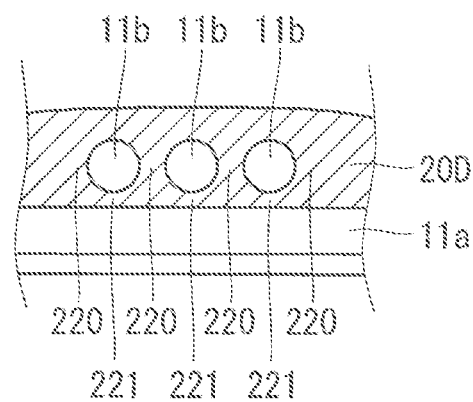
FIG. 15 is a cross-sectional view illustrating an example of the wiring member according to the fourth embodiment.

Note that, as illustrated in FIG. 15, the joining member 20D may include second portions 221 interposed between the wire-like transmission members 11a and 11b at the crossing parts 13. In this case, the wire-like transmission members 11a and 11b are joined to each other at and around the crossing parts 13, and thus the positional relationship between the wire-like transmission members 11a and 11b at the crossing parts 13 can be further firmly held. When the joining member 20D is caused to flow onto the sheet 12 in a state in which the wire-like transmission members 11b slightly come loose from the wire-like transmission member 11a at the crossing parts 13, the structure illustrated in FIG. 15 is obtained.

Fifth Embodiment

Figure 16:
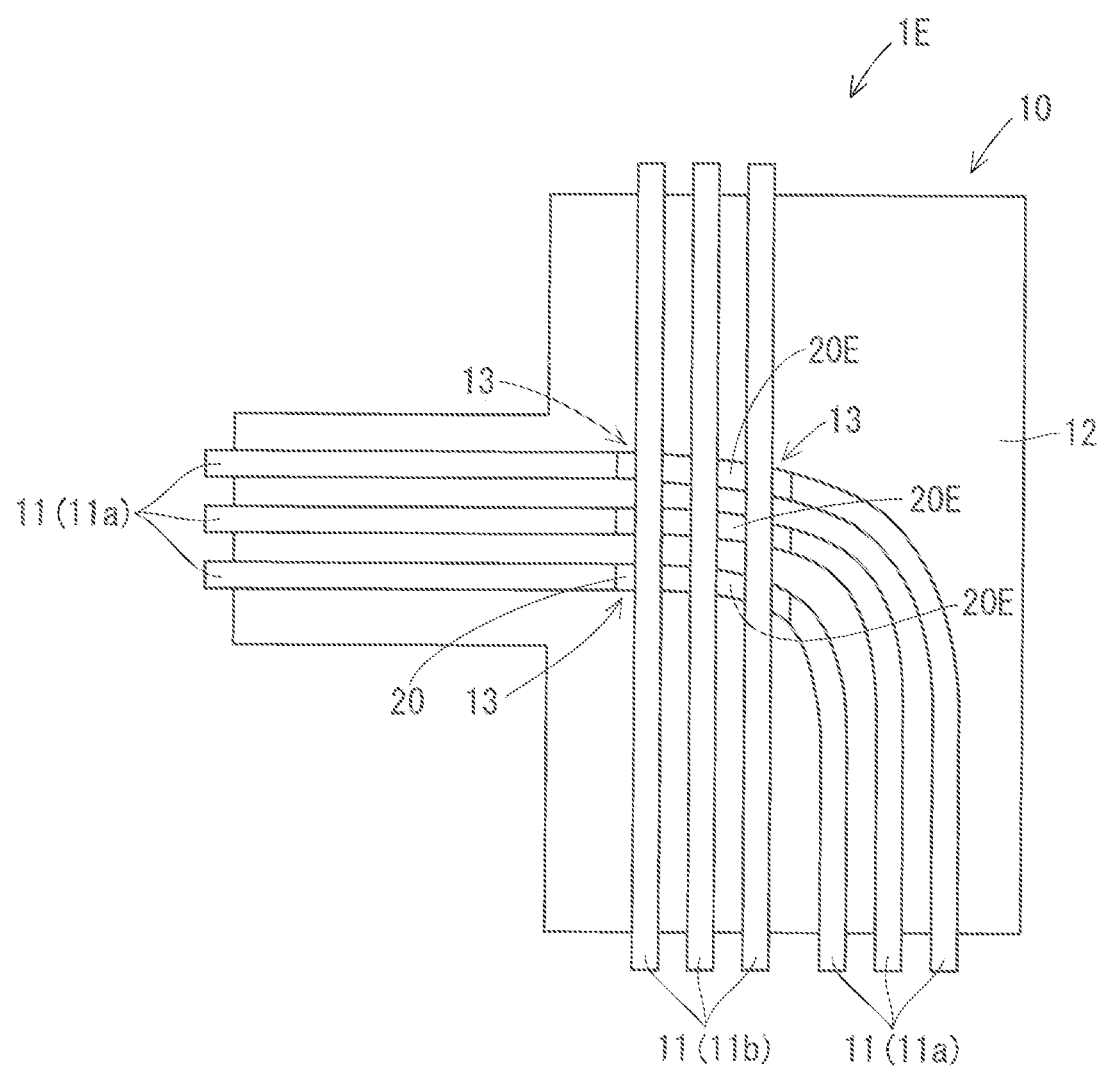
FIG. 16 is a plan view illustrating an example of a wiring member according to the fifth embodiment.
Figure 17:
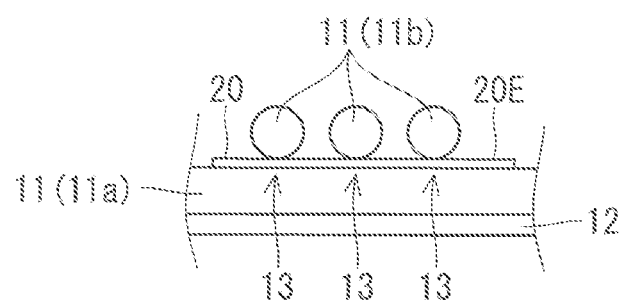
FIG. 17 is a cross-sectional view illustrating an example of the wiring member according to the fifth embodiment.

A wiring member 1E according to the fifth embodiment will be described. FIG. 16 is a schematic cross-sectional view of the wiring member 1E. FIG. 17 is a schematic cross-sectional view of the wiring member 1E. Note that, in the description of the present embodiment, constituent elements similar to those described in the first, second, third, and fourth embodiments are denoted by the same reference signs, and description thereof will be omitted.

The holding member 20 included in the wiring member 1E includes joining members 20E that are interposed between the wire-like transmission members 11a and 11b at the crossing parts 13 and join the wire-like transmission members 11a and 11b. The joining member 20E is, for example, a double-sided tape. The joining member 20E may be a member other than a double-sided tape. For example, the joining member 20E may be an adhesive agent.

In the present example, the joining member 20E is present at each of the plurality of crossing parts 13. In the present example, the holding member 20 includes three joining members 20E. The three joining members 20E are respectively provided in three wire-like transmission members 11a. One joining member 20E is interposed between one wire-like transmission member 11a and three wire-like transmission members 11b that cross the one wire-like transmission member 11a. The joining members 20E are different from the joining member 20D of the wiring member 1D, and do not include portions to adhere to the wire-like transmission members 11a and 11b around the crossing parts 13.

Note that the joining members 20E may be provided at a part of the plurality of crossing parts 13. Further, in the present example, one joining member 20E is provided for three crossing parts 13; however, one joining member 20E may be provided for two crossing parts 13. Further, one joining member 20E may be provided for one crossing part 13.

In this manner, in the present embodiment, the holding member 20 includes the joining members 20E that are interposed between the wire-like transmission members 11a and 11b at the crossing parts 13 and that join the wire-like transmission members 11a and 11b. In this manner, the wire-like transmission members 11a and 11b are joined to each other at the crossing parts 13, the positional relationship between the wire-like transmission members 11a and 11b at the crossing parts 13 can be firmly held.

Sixth Embodiment

Figure 18:
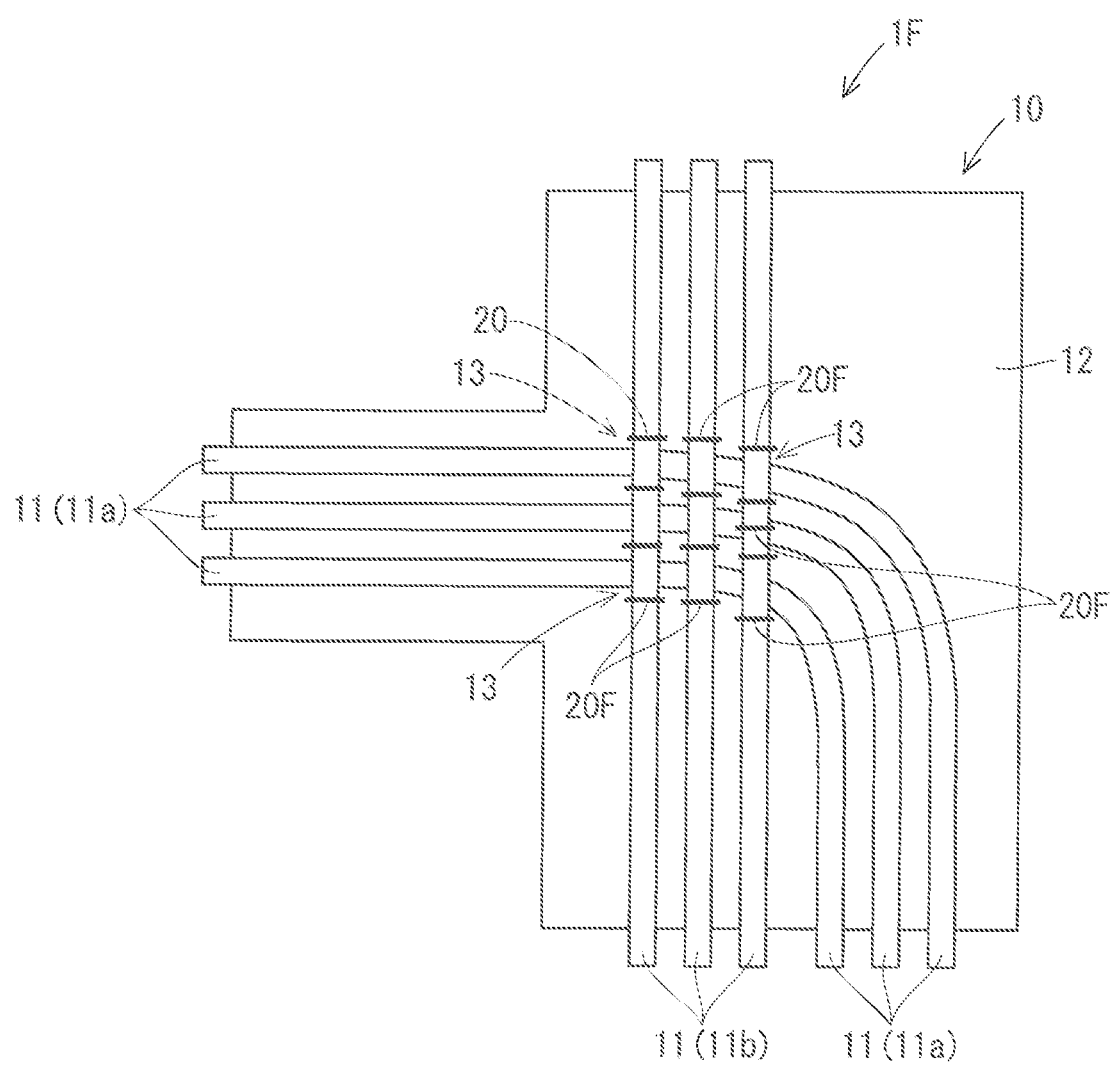
FIG. 18 is a plan view illustrating an example of a wiring member according to the sixth embodiment.

A wiring member 1F according to the sixth embodiment will be described. FIG. 18 is a schematic cross-sectional view of the wiring member 1F. Note that, in the description of the present embodiment, constituent elements similar to those described in the first, second, third, fourth, and fifth embodiments are denoted by the same reference signs, and description thereof will be omitted.

The holding member 20 included in the wiring member 1F includes staples 20F for fixing the wire-like transmission members 11b to the sheet 12. The staples are fasteners released from a stapler. The stapler is also referred to as a Hotchkiss. The staples are also referred to as Hotchkiss staples. The staples 20F may be made of resin, may be made of metal, or may be made of another material.

The holding member 20 includes a plurality of staples 20F. The staples 20F fixes the wire-like transmission members 11b to the sheet 12 around the crossing parts 13. The staples 20F is applied to the sheet 12 from above the wire-like transmission members 11b so as to press the wire-like transmission members 11b onto the sheet 12. The staples 20F are applied to the sheet 12 so as to interpose the wire-like transmission members 11b between the staples 20F and the sheet 12. In the example of FIG. 18, the staple 20F is located around each crossing part 13; however, the staples 20F may be located around only a part of the plurality of crossing parts 13.

Figure 19:
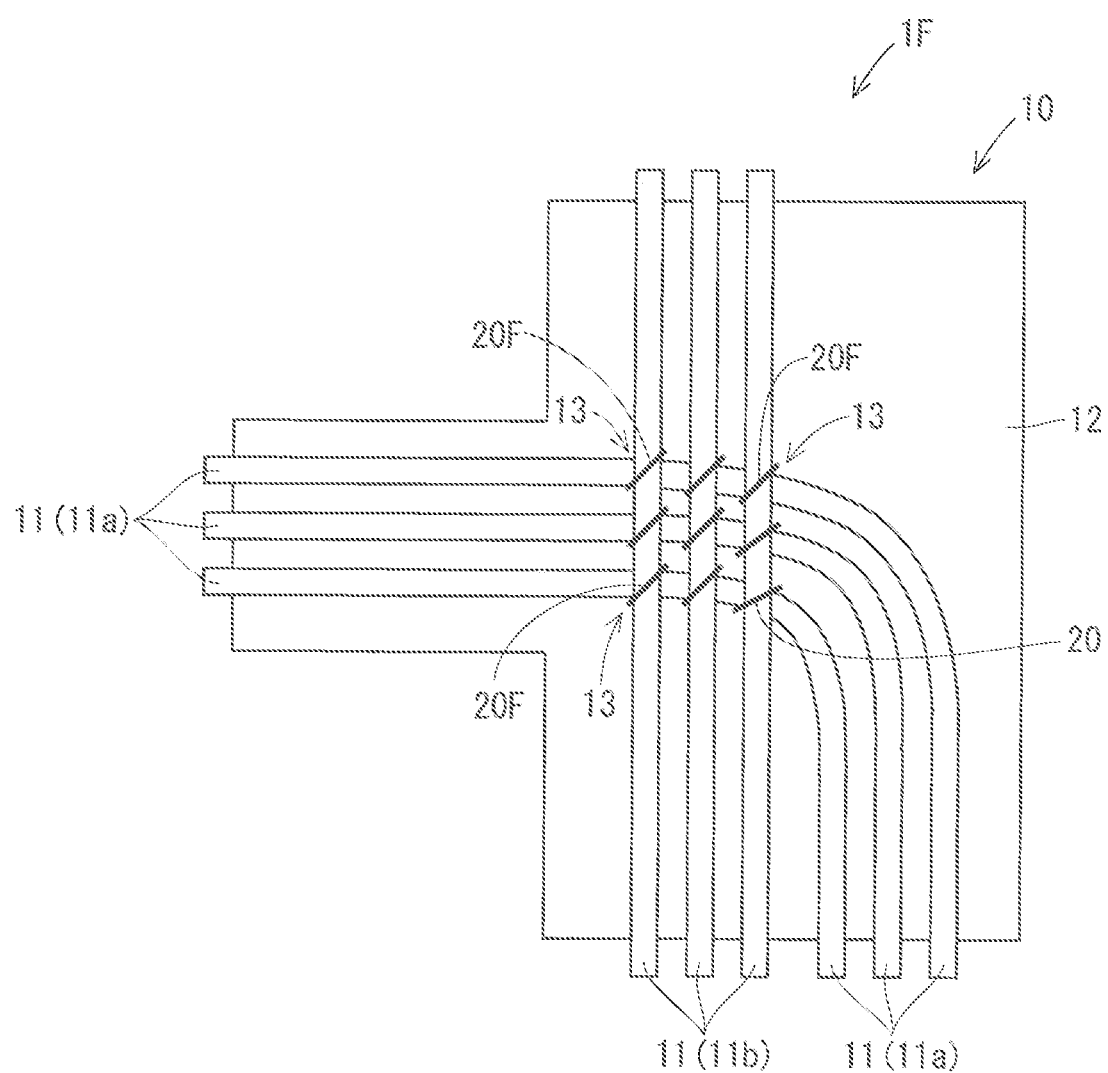
FIG. 19 is a plan view illustrating an example of the wiring member according to the sixth embodiment.

Note that the position and the number of staples 20F are not limited to the example described above. For example, with the use of a single staple 20F, a plurality of wire-like transmission members 11b may be fixed to the sheet 12. Further, as illustrated in FIG. 19, the staples 20F may be located at the crossing parts 13. In the example of FIG. 19, the staples 20F are applied to the sheet 12 from above the wire-like transmission members 11b so as to press the wire-like transmission members 11b and the wire-like transmission members 11a onto the sheet 12 at the crossing parts 13. The staples 20F are applied to the sheet 12 so as to interpose the wire-like transmission members 11a and 11b between the staples 20F and the sheet 12. In the example of FIG. 19, the staples 20F are provided at all of the plurality of crossing parts 13; however, the staples 20F may be provided at a part of the plurality of crossing parts 13.

Seventh Embodiment

Figure 20:
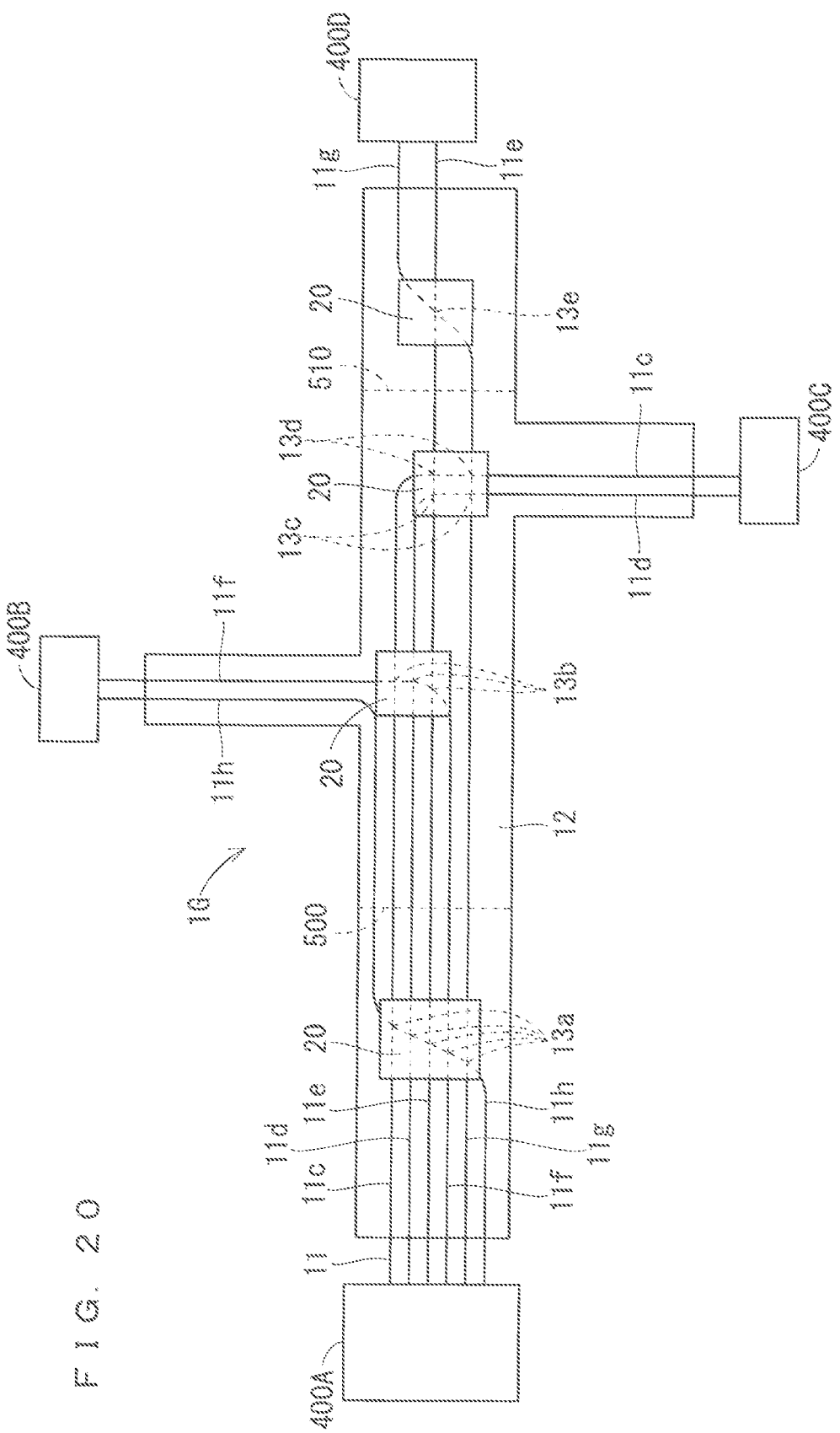
FIG. 20 is a plan view illustrating an example of a wiring member according to the seventh embodiment.
Figure 21:
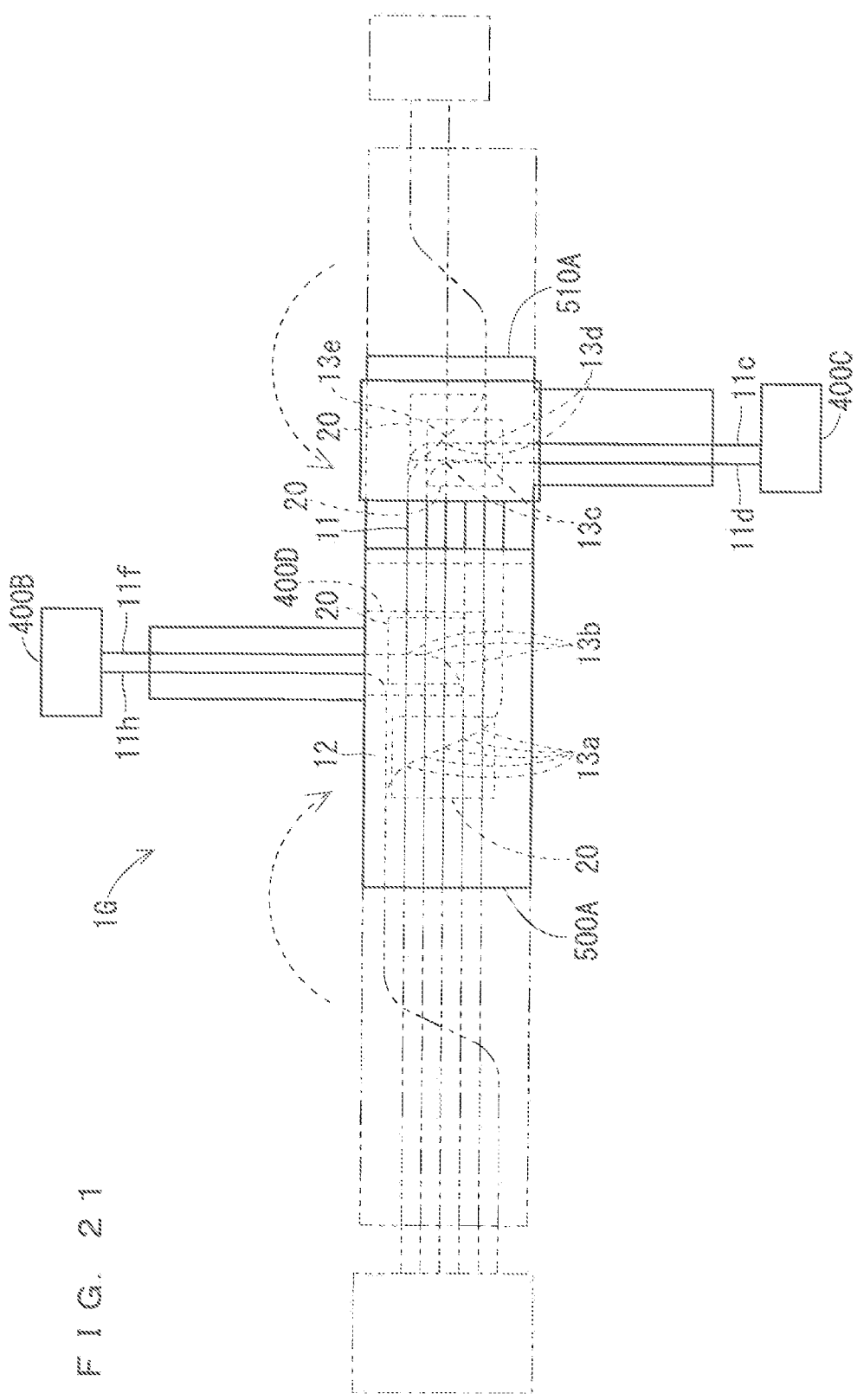
FIG. 21 is a plan view illustrating an example of the wiring member according to the seventh embodiment.

A wiring member 1G according to the seventh embodiment will be described. FIG. 20 is a schematic plan view of the wiring member 1G. FIG. 21 is a schematic plan view illustrating the wiring member 1G in a state in which the wiring member 1G is folded, that is, a packaging form. Note that, in the description of the present embodiment, constituent elements similar to those described in the first, second, third, fourth, fifth, and sixth embodiment are denoted by the same reference signs, and description thereof will be omitted.

The plurality of wire-like transmission members 11 included in the wiring member 1G include wire-like transmission members 11c, 11d, 11e, 11f, 11g, and 11h. When the wiring member 1G is packed, carried, or the like, the wiring member 1G is folded to be put into a compact packaging form. Folds 500 and 510 are folds made after folding, at the time of being formed into the packaging form. Regarding folding of the wiring member 1G, the wiring member 1G may be folded to such a degree that allows a portion of the wiring member 1G to be placed over another portion. It is assumed that the folds 500 and 510 may be left as folding creases in the sheet 12, or may be left as folding creases in the wire-like transmission members 11, for examples.

In the present example, the plurality of wire-like transmission members 11 cross on the sheet 12. Specifically, the wire-like transmission member 11h is curved and crosses the wire-like transmission members 11c, 11d, 11e, 11f, and 11g, and thus five crossing parts 13a are generated. Further, the wire-like transmission member 11f is curved and crosses the wire-like transmission members 11c, 11d, and 11e, and thus three crossing parts 13b are generated. Further, the wire-like transmission member 11d is curved and crosses the wire-like transmission members 11e and 11g, and thus two crossing parts 13c are generated. Further, the wire-like transmission member 11c is curved and crosses the wire-like transmission members 11e and 11f, and thus two crossing parts 13d are generated. Further, the wire-like transmission member 11g is curved and crosses the wire-like transmission member 11e, one crossing part 13e is generated.

A connector 400A is connected to one end of each of the wire-like transmission members 11c, 11d, 11e, 11f, 11g, and 11h. A connector 400B is connected to another end of each of the wire-like transmission members 11f and 11h. A connector 400C is connected to another end of each of the wire-like transmission members 11c and 11d. A connector 400D is connected to another end of the wire-like transmission members 11e and 11g.

The holding member 20 is provided at the plurality of crossing parts 13a. With this configuration, at each crossing part 13a, the positional relationship of two crossing wire-like transmission members 11 are held. In the example of FIG. 20, the holding member 20 is the sheet 20B, the wiring member 20C, or the joining member 20D. The holding member 20 may be the tape 20A, the joining members 20E, or the staples 20F.

Further, the holding member 20 is provided at the plurality of crossing parts 13b. Further, the holding member 20 is provided at a plurality of crossing parts 13c and a plurality of crossing parts 13d. Further, the holding member 20 is provided at the crossing part 13e.

Folds 500 and 510 are formed in the wiring member 1G. The folds 500 and 510 are folds made by folding the wiring member 1G so as to be put into a compact packaging form for the purpose of packing, carrying, and the like. The crossing parts 13a, 13b, 13c, 13d, and 13e are located at positions except the folds 500 and 510. Further, each holding member 20 is also located at a position except the folds 500 and 510.

As illustrated in FIG. 2, the wiring member 1G in a form in which the wiring member 1G is folded, that is, a packaging form, is in a state in which the crossing parts 13c, 13d, 13e, 13f, 13g, and 13h are located at positions except folded parts 500A and 510A. Further, the wiring member 1G in a packaging form is in a state in which each holding member 20 is located at a position except the folded parts 500A and 510A. The folds 500 and 510 are observed as marks left as folding creases in the sheet 12, or as marks left as folding creases in the wire-like transmission members 11.

According to the wiring member 1G in a packed form configured as described above, the crossing parts 13a, 13b, 13c, 13d, and 13e of the plurality of wire-like transmission members 11 and the holding member 20 are located at positions except the folded parts 500A and 510A of the sheet 12, and thus paths of the wire-like transmission members 11 are prevented from being disturbed on the sheet 12, and the wire-like transmission members 11 are prevented from separating from the sheet 12. Further, in the wiring member 1G illustrated in FIG. 20 as well, the crossing parts 13a, 13b, 13c, 13d, and 13e and the holding member 20 are located at positions except the folds 500 and 510 of the sheet 12, which means that the sheet 12 was folded at positions except the crossing parts 13a, 13b, 13c, 13d, and 13e and the holding member 20 at the time of packing, carrying, and the like. Thus, paths of the wire-like transmission members 11 are prevented from being disturbed on the sheet 12, and the wire-like transmission members 11 are prevented from separating from the sheet 12.

Note that how to fold the wiring member 1G is not limited to the above example. The wiring member 1G may be folded at one position, or may be folded at three or more positions. The wiring member 1G may be folded in a line inclined with respect to an extension direction of the sheet 12.

Further, the holding member 20 may be a member having rigidity higher than that of the wire-like transmission members 11. With this configuration, the wiring member 1G is less liable to be folded at the crossing parts 13. As a result, paths of the wire-like transmission members 11 are prevented from being disturbed on the sheet 12, and the wire-like transmission members are prevented from separating from the sheet 12.

Eighth Embodiment

A wiring member 1H according to the eighth embodiment will be described. FIG. 22 is a schematic plan view of the wiring member 1H. Note that, in the description of the present embodiment, constituent elements similar to those described in the first, second, third, fourth, fifth, sixth, and seventh embodiments are denoted by the same reference signs, and description thereof will be omitted.

The wiring member 1H includes vehicle fixing portions 600 attached to the sheet 12. The vehicle fixing portions 600 are components that can be fixed to the vehicle. As the vehicle fixing portion 600, for example, a component capable of locking fixing by being fitted into a hole formed in the vehicle, or a component of what is called a clamp or a clip can be used. As a fixing structure of the vehicle fixing portion 600 with respect to the sheet 12, various types of fixing structures can be adopted, such as ultrasonic welding, thermal welding, fixing using an adhesive agent or an adhesive agent, and clamping fixing. The vehicle fixing portion 600 is, for example, provided on a surface of the sheet 12 on the opposite side of the surface to which the wire-like transmission members 11 are fixed.

The crossing parts 13a and the holding member 20 provided at the crossing parts 13a are located in a region of the sheet 12 corresponding to the vehicle fixing portions 600. Here, the crossing parts 13a and the holding member 20 provided at the crossing parts 13a are located inside a pair of lines 600L, which is obtained by extending both the ends of the vehicle fixing portions 600 in the extension direction of the sheet 12 in a direction perpendicular to the extension direction of the sheet 12 (specifically, portions of the sheet 12 in which the crossing parts 13a, 13b, 13c, 13d, and 13e are provided). Further, the crossing part 13e and the holding member 20 provided at the crossing part 13e are located in a region of the sheet 12 corresponding to the vehicle fixing portions 600.

The vehicle fixing portion 600 is a component made of resin, metal, or the like, and the sheet 12 is hardly bent in a region in which the vehicle fixing portions 600 are provided. Thus, the sheet 12 is folded at positions except the vehicle fixing portion 600. Thus, in the crossing parts 13a and 13e and the holding member 20 provided at the crossing parts 13a and 13e, a wiring member 1H cannot be folded, and paths of the wire-like transmission members 11 are prevented from being disturbed on the sheet 12, and the wire-like transmission members 11 are prevented from separating from the sheet 12.

Figure 23:
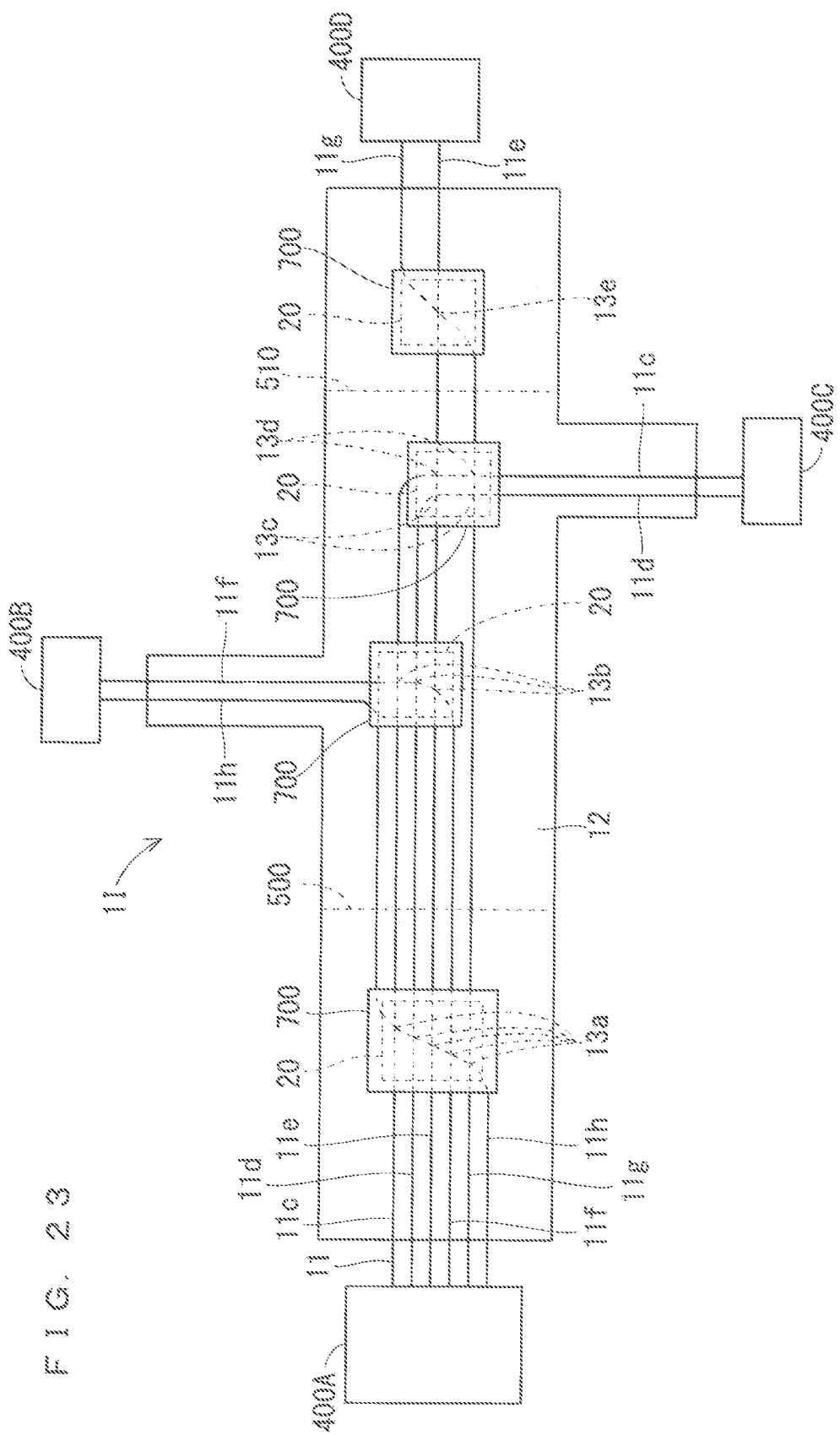
FIG. 23 is a plan view illustrating an example of a wiring member according to a modification.

Note that, in the holding member 20, members 700 having rigidity higher than that of the wire-like transmission members 11 may be provided. FIG. 23 is a schematic plan view illustrating a wiring member 11 including members 700. In the example of FIG. 23, the members 700 are provided so as to cover the holding member 20. With the members 700 having rigidity higher than that of the wire-like transmission members 11 being provided in the holding member 20, the wiring member 11 is less liable to be folded at the crossing parts 13. As a result, paths of the wire-like transmission members 11 are prevented from being disturbed on the sheet 12, and the wire-like transmission members are prevented from separating from the sheet 12. Note that, in the wiring member 1H illustrated in FIG. 22, the members 700 may be provided for the holding member 20.

While the wiring member has been shown and described in detail, the foregoing description is in all aspects illustrative and the disclosure is not restrictive. Further, various modifications described above can be applied in combination with each other as long as there is no inconsistency. It is therefore understood that numerous unillustrated modifications can be devised without departing from the scope of the present disclosure.

EXPLANATION OF REFERENCE SIGNS 1A, 1B, 1C, 1E, 1F, 1G, 1H, 1I, 10, 20C Wiring member
11, 11a, 11b, 11c, 11d, 11e, 11f, 11g, 11h, 211 Wire-like transmission member
12, 20B, 212 Sheet 13, 13a, 13b, 13c, 13d Crossing part
20 Holding member
20A Tape
20a First corner
20b Second corner
20c Third corner
20D, 20E Joining member
20d Fourth corner
20F Staple
110a, 110aa, 110b Gap
200, 200a, 200b, 200c, 200d, 200e, 200f, 200g, 201a, 201b, 201c Fixed region
220, 220a, 220b First portion
221 Second portion
400A, 400B, 400C Connector
500, 510 Fold
500A, 510A Folded part
600 Vehicle fixing portion
600L Line
700 Member

The invention claimed is:

1. A wiring member comprising
a first wiring member including a first sheet, and a plurality of first wire-like transmission members fixed onto the first sheet, wherein
the plurality of first wire-like transmission members include a second wire-like transmission member, and a third wire-like transmission member extending over the second wire-like transmission member and crossing the second wire-like transmission member,
the wiring member further comprises a holding member configured to hold a positional relationship between the second and third wire-like transmission members at a crossing part of the second and third wire-like transmission members, and
each of the second wire-like transmission member and the third wire-like transmission member includes insulation covering, and an area of the first sheet in which the holding member is present is smaller than an area of the first sheet in which the holding member is not present.

2. The wiring member according to claim 1, wherein
the holding member includes a second sheet fixed to the first sheet so as to cover the crossing part.

3. The wiring member according to claim 1, wherein
the holding member includes a quadrilateral second sheet fixed to the first sheet so as to cover the crossing part,
a fixed region of the second sheet includes four first regions fixed to the first sheet, the four first regions being located around the crossing part at four corners of the quadrilateral second sheet, and
the second sheet includes a non-fixed region provided between the first wire-like transmission members and the four first regions, the non-fixed region not being fixed to the first sheet.

4. The wiring member according to claim 3, wherein
the fixed region includes a second region extending along an edge of the third wire-like transmission member from the four first regions.

5. The wiring member according to claim 1, wherein
the holding member includes a second sheet fixed to the first sheet so as to cover the crossing part,
a fixed region of the second sheet fixed to the first sheet includes a first region extending along an edge of the third wire-like transmission member, and the second sheet includes a non-fixed region provided between an outer end of the first region and an end of the second sheet, the non-fixed region not being fixed to the first sheet.

6. The wiring member according to claim 1, wherein
the holding member includes a second wiring member placed over the first wiring member so as to cover the crossing part.

7. The wiring member according to claim 6, wherein
the second wiring member includes a third sheet, and a plurality of fourth wire-like transmission members fixed onto the third sheet.

8. The wiring member according to claim 1, wherein
the holding member includes a joining member configured to join the second and third wire-like transmission members, and
the joining member includes a first portion adhering to the second and third wire-like transmission members around the crossing part.

9. The wiring member according to claim 8, wherein
the joining member includes a second portion interposed between the second and third wire-like transmission members at the crossing part.

10. The wiring member according to claim 1, wherein
the holding member includes a joining member being interposed between the second and third wire-like transmission members at the crossing part, and being configured to join the second and third wire-like transmission members.

11. The wiring member according to claim 1, wherein
the holding member is located at a position except a fold of the wiring member.

12. The wiring member according to claim 1, further comprising
a vehicle fixing portion attached to the first sheet, wherein
the holding member is located in a region of the first sheet corresponding to the vehicle fixing portion.

13. The wiring member according to claim 1, wherein
the holding member includes a second sheet fixed to the first sheet so as to cover the crossing part,
a fixed region of the second sheet fixed to the first sheet includes a first region located around the crossing part, the first region extending along an end of the second sheet, and
the second sheet includes a non-fixed region provided between the first wire-like transmission members and the first region, the non-fixed region not being fixed to the first sheet.

14. A wiring member comprising
a first wiring member including a first sheet, and a plurality of first wire-like transmission members fixed onto the first sheet, wherein
the plurality of first wire-like transmission members include a second wire-like transmission member, and a third wire-like transmission member extending over the second wire-like transmission member and crossing the second wire-like transmission member,
the wiring member further comprises a holding member configured to hold a positional relationship between the second and third wire-like transmission members at a crossing part of the second and third wire-like transmission members, and
the holding member includes a tape wound around the first sheet so as to cover the crossing part.

15. The wiring member according to claim 14, wherein
the first sheet has a first main surface onto which the plurality of first wire-like transmission members are fixed, and a second main surface positioned on the opposite side of the first main surface, and the tape covers the crossing part such that the tape is present on the first main surface of the first sheet and on the second main surface of the first sheet.

\* \* \* \* \*